(12) United States Patent
Lee et al.

(10) Patent No.: US 12,547,219 B2
(45) Date of Patent: Feb. 10, 2026

(54) ELECTRONIC DEVICE AND METHOD FOR REFLECTING SCREEN ON PORTION OF FLEXIBLE DISPLAY ON BASIS OF FLEXIBLE DISPLAY SHAPE

(71) Applicant: SAMSUNG ELECTRONICS CO., LTD., Suwon-si (KR)

(72) Inventors: Hyungmin Lee, Suwon-si (KR); Jun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/987,025

(22) Filed: Dec. 19, 2024

(65) Prior Publication Data

US 2025/0123656 A1 Apr. 17, 2025

Related U.S. Application Data

(63) Continuation of application No. PCT/KR2023/006173, filed on May 4, 2023.

(30) Foreign Application Priority Data

Jul. 1, 2022 (KR) .................. 10-2022-0081517
Jul. 8, 2022 (KR) .................. 10-2022-0084671

(51) Int. Cl.
*G06F 3/041* (2006.01)
*G06F 1/16* (2006.01)
(Continued)

(52) U.S. Cl.
CPC ............ *G06F 1/1677* (2013.01); *G06F 1/165* (2013.01); *G06F 1/1652* (2013.01); *G06F 3/0485* (2013.01); *G06F 3/1423* (2013.01)

(58) Field of Classification Search
CPC .......... G06F 1/16; G06F 1/1641; G06F 1/165; G06F 1/1652; G06F 1/1677;
(Continued)

(56) References Cited

U.S. PATENT DOCUMENTS 9,139,133 B2    9/2015   Eng et al.
9,690,104 B2    6/2017   Kim
(Continued)

FOREIGN PATENT DOCUMENTS

CN    111124561 A    5/2020
CN    112965681 A    6/2021
(Continued)

OTHER PUBLICATIONS

International Search Report for PCT/KR2023/006173, mailed Aug. 17, 2023, 4 pages.
(Continued)

*Primary Examiner* — Joe H Cheng
(74) *Attorney, Agent, or Firm* — Nixon & Vanderhye, P.C.

(57) ABSTRACT

An electronic device according to an embodiment may include: a first housing; a second housing; a hinge structure including a hinge configured to couple the second housing to the first housing to be rotatable with respect to the first housing; a flexible display disposed at the first housing and the second housing; memory comprising one or more storage mediums storing instructions; a sensor configured to detect an angle between the first housing and the second housing; and at least one processor, comprising processing circuitry, operatively coupled to the flexible display, the memory, and the sensor, wherein at least one processor, individually and/or collectively, may be configured to control the electronic device to: display a first screen within a first portion among the first portion and a second portion of
(Continued)

the flexible display based on detecting, using the sensor, an angle included within a specified range; and display, within the second portion, a second screen for reflection of the first screen by the second portion while displaying the first screen within the first portion.

20 Claims, 18 Drawing Sheets

(51) Int. Cl.
  *G06F 3/0485* (2022.01)
  *G06F 3/14* (2006.01)
(58) Field of Classification Search
  CPC .... G06F 1/1694; G06F 3/0485; G06F 3/1423; G06F 2203/04803; G09F 9/301
  See application file for complete search history.

(56) References Cited

U.S. PATENT DOCUMENTS

| | | | |
|---|---|---|---|
| 9,944,317 | B2 | 4/2018 | Lee |
| 10,785,351 | B2 | 9/2020 | Li |
| 11,144,095 | B2 | 10/2021 | La et al. |
| 11,169,566 | B2 * | 11/2021 | Kim ................... G06F 1/1681 |
| 11,228,669 | B2 | 1/2022 | Jang et al. |
| 2022/0078271 | A1 | 3/2022 | Griffith |
| 2024/0028186 | A1 | 1/2024 | Kang |
| 2025/0118235 | A1 * | 4/2025 | Lee ................... H04M 1/72454 |

FOREIGN PATENT DOCUMENTS

| | | |
|---|---|---|
| CN | 215834151 U | 2/2022 |
| JP | 2019535026 A | 12/2019 |
| JP | 2021047316 A | 3/2021 |
| KR | 20220007469 A | 1/2022 |
| KR | 20220011115 A | 1/2022 |
| KR | 20220033247 A | 3/2022 |
| KR | 20220035754 A | 3/2022 |

OTHER PUBLICATIONS

Written Opinion of the ISA for PCT/KR2023/006173, mailed Aug. 17, 2023, 3 pages.

* cited by examiner

ELECTRONIC DEVICE AND METHOD FOR REFLECTING SCREEN ON PORTION OF FLEXIBLE DISPLAY ON BASIS OF FLEXIBLE DISPLAY SHAPE

CROSS-REFERENCE TO RELATED APPLICATIONS

This application is a continuation of International Application No. PCT/KR2023/006173 designating the United States, filed on May 4, 2023, in the Korean Intellectual Property Receiving Office and claiming priority to Korean Patent Application Nos. 10-2022-0081517, filed on Jul. 1, 2022, and 10-2022-0084671, filed on Jul. 8, 2022, in the Korean Intellectual Property Office, the disclosures of each of which are incorporated by reference herein in their entireties.

BACKGROUND

Field

The disclosure relates to an electronic device and a method for reflecting a screen on a portion of a flexible display on basis of a flexible display shape.

Description of Related Art

Recently, spread of various types of portable electronic devices such as a smartphone, a tablet PC, a wireless earphone, and a smart watch is expanding. A portion of the electronic devices may include a flexible display that is deformable. An electronic device including the flexible display may provide, through the flexible display, a folding state (e.g., fully folding), an unfolding state (e.g., fully unfolding), and an intermediate state between the folding state and the unfolding state. The electronic device may provide various UIs to a user within an intermediate state.

SUMMARY

According to an example embodiment, an electronic device may comprise: a first housing, a second housing, a hinge structure including a hinge rotatably coupling the second housing to the first housing, a flexible display disposed at the first housing and the second housing, memory comprising one or more storage mediums storing instructions, a sensor configured to detect an angle between the first housing and the second housing, and at least one processor, comprising processing circuitry, operably coupled to the flexible display, the memory, and the sensor, wherein the instructions, when executed by the at least one processor individually or collectively, may cause the electronic device to: display a first screen within a first portion between the first portion and a second portion of the flexible display, based on identifying the angle included in a specified range, using the sensor; and while displaying the first screen within the first portion, display, within the second portion, a second screen reflecting the first screen in the second portion.

According to an example embodiment, an electronic device may comprise: a first housing, a second housing, a hinge structure including a hinge rotatably coupling the second housing to the first housing, a flexible display disposed at the first housing and the second housing, memory comprising one or more storage mediums storing instructions, a sensor configured to detect an angle between the first housing and the second housing, and at least one processor, comprising processing circuitry, operably coupled to the flexible display, the memory, and the sensor, wherein the instructions, when executed by the at least one processor individually or collectively, may cause the electronic device to: based on identifying the angle exceeding a specified angle from the sensor, display, within a first portion and a second portion different from the first portion of the flexible display, a first screen based on a first direction; while displaying, within the first portion and the second portion, the first screen based on the first direction, based on identifying that the angle is decreased to be equal to or less than the specified angle, using the sensor, display, within the first portion, a second screen associated with the first screen and based on a second direction different from the first direction; and while displaying, within the first portion, the second screen, in response to receiving an input within the second portion, within the second screen displayed within the first portion, executing a function based on the input.

According to an example embodiment, an electronic device may comprise: a first housing, a second housing, a hinge structure comprising a hinge rotatably coupling the second housing to the first housing, a flexible display disposed at the first housing and the second housing, memory comprising one or more storage mediums storing instructions, a sensor configured to detect an angle between the first housing and the second housing, and at least one processor, comprising processing circuitry, operably coupled to the flexible display, the memory, and the sensor, wherein the instructions, when executed by the at least one processor individually or collectively, may cause the electronic device to: identify, from the sensor, the angle exceeding a specified angle; based on identifying the angle, display a first screen within a first portion of the flexible display based on a first direction, using a first application among a plurality of applications stored in the memory; while displaying the first screen in the first portion, display a second screen different from the first screen within a second portion different from the first portion; while displaying the second screen, receive at least one input within the second portion; and in response to receiving the input, initiate execution of the first application, within the first screen based on the first direction.

According to an example embodiment, a method of operating an electronic device may comprise: based on identifying an angle exceeding a specified angle from a sensor, displaying, within a first portion and a second portion different from the first portion of a flexible display, a first screen based on a first direction; while displaying, within the first portion and the second portion, the first screen based on the first direction, based on identifying that the angle is decreased to be equal to or less than the specified angle, using the sensor, displaying, within the first portion, a second screen associated with the first screen and based on a second direction different from the first direction; and while displaying, within the first portion, the second screen, in response to receiving an input within the second portion, within the second screen displayed within the first portion, executing a function based on the input.

According to an example embodiment, a method of operating an electronic device may comprise: in a state that a surface of a first housing and a surface of a second housing are in contact, identifying, an angle exceeding a specified angle from a sensor; based on identifying the angle, displaying, a first screen within a first portion of a flexible display based on a first direction, using a first application among a plurality of applications stored in memory; while displaying the first screen in the first portion, displaying, a second screen different from the first screen within a second portion different from the first portion, and while displaying the second screen, receiving at least one input within the second portion; and in response to receiving the input, initiating execution of the first application.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure will be described with reference to the attached drawings.

Figure 1:
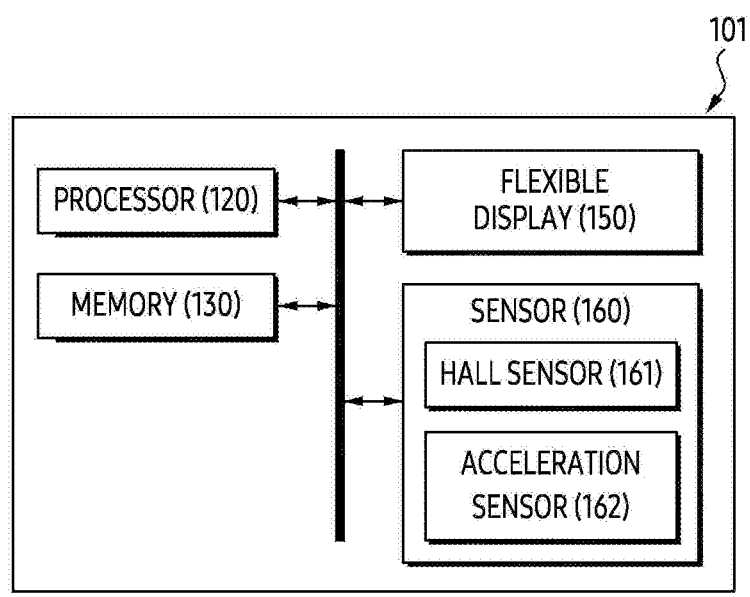
FIG. 1 is a block diagram illustrating an example configuration of an electronic device according to various embodiments.

FIG. 1 is a block diagram illustrating an example configuration of an electronic device according to various embodiments. Referring to FIG. 1, an electronic device 101 according to an embodiment may include at least one of a processor (e.g., including processing circuitry) 120, a memory 130, a flexible display 150, and a sensor 160. The processor 120, the memory 130, the flexible display 150, and the sensor 160 may be electronically and/or operably coupled with each other by an electronical component such as a communication bus. A type and/or the number of a hardware component included in the electronic device 101 is not limited as illustrated in FIG. 1. For example, the electronic device 101 may include only a portion of the hardware component illustrated in FIG. 1.

According to an embodiment, the processor 120 of the electronic device 101 may include a hardware component for processing data based on one or more instructions. The hardware component for processing data may include various processing circuitry, for example, an arithmetic and logic unit (ALU), a field programmable gate array (FPGA), a central processing unit (CPU). The number of the processor 120 may be one or more. For example, the processor 120 may have a structure of a multi-core processor such as a dual core, a quad core, or a hexa core. The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an embodiment, the memory 130 of the electronic device 101 may include a hardware component for storing data and/or instructions inputted and/or outputted to the processor 120. The memory 130 may include, for example, a volatile memory such as random-access memory (RAM) and/or a non-volatile memory such as read-only memory (ROM). The volatile memory may include, for example, at least one of dynamic RAM (DRAM), static RAM (SRAM), Cache RAM, and pseudo SRAM (PSRAM). The non-volatile memory may include, for example, at least one of programmable ROM (PROM), erasable PROM (EPROM), electrically erasable PROM (EEPROM), flash memory, a hard disk, a compact disk, and an embedded multi media card (eMMC).

According to an embodiment, in the memory 130 of the electronic device 101, one or more instructions indicating an operation to be performed by the processor 120 in data may be stored. A set of instructions may be referred to as firmware, an operating system, a process, a routine, a sub-routine, and/or an application. For example, the electronic device 101 and/or the processor 120 of the electronic device 101 may execute a set of a plurality of instructions distributed in a form of an application to perform at least one of operations of FIGS. 13 to 15.

Figure 2A:
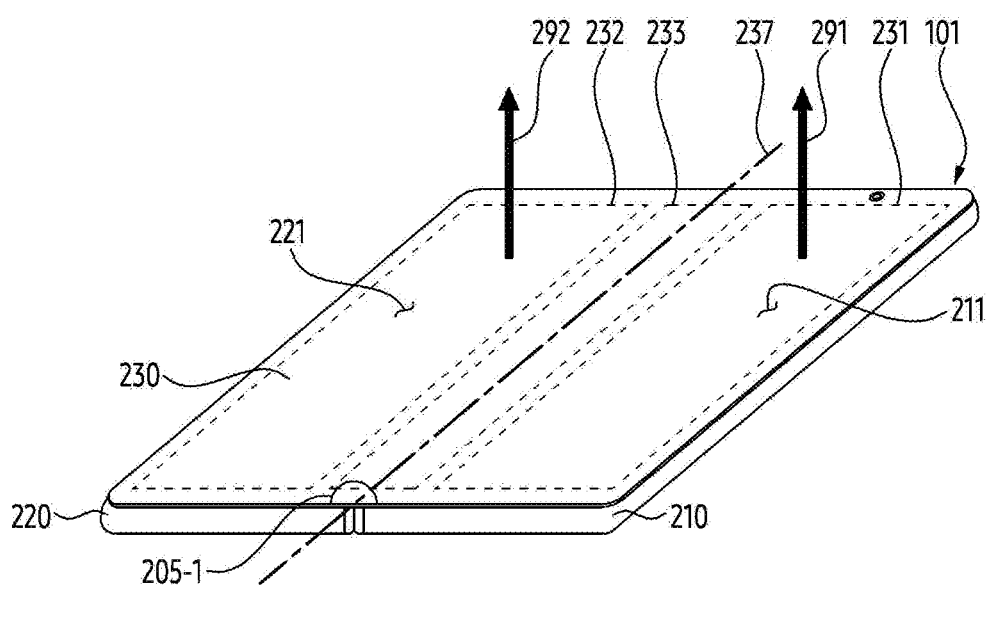
FIGS. 2A and 2B are perspective views illustrating an example of a locational relationship between a first housing and a second housing in an unfolding state and a folding state of an electronic device according to various embodiments.
Figure 2B:
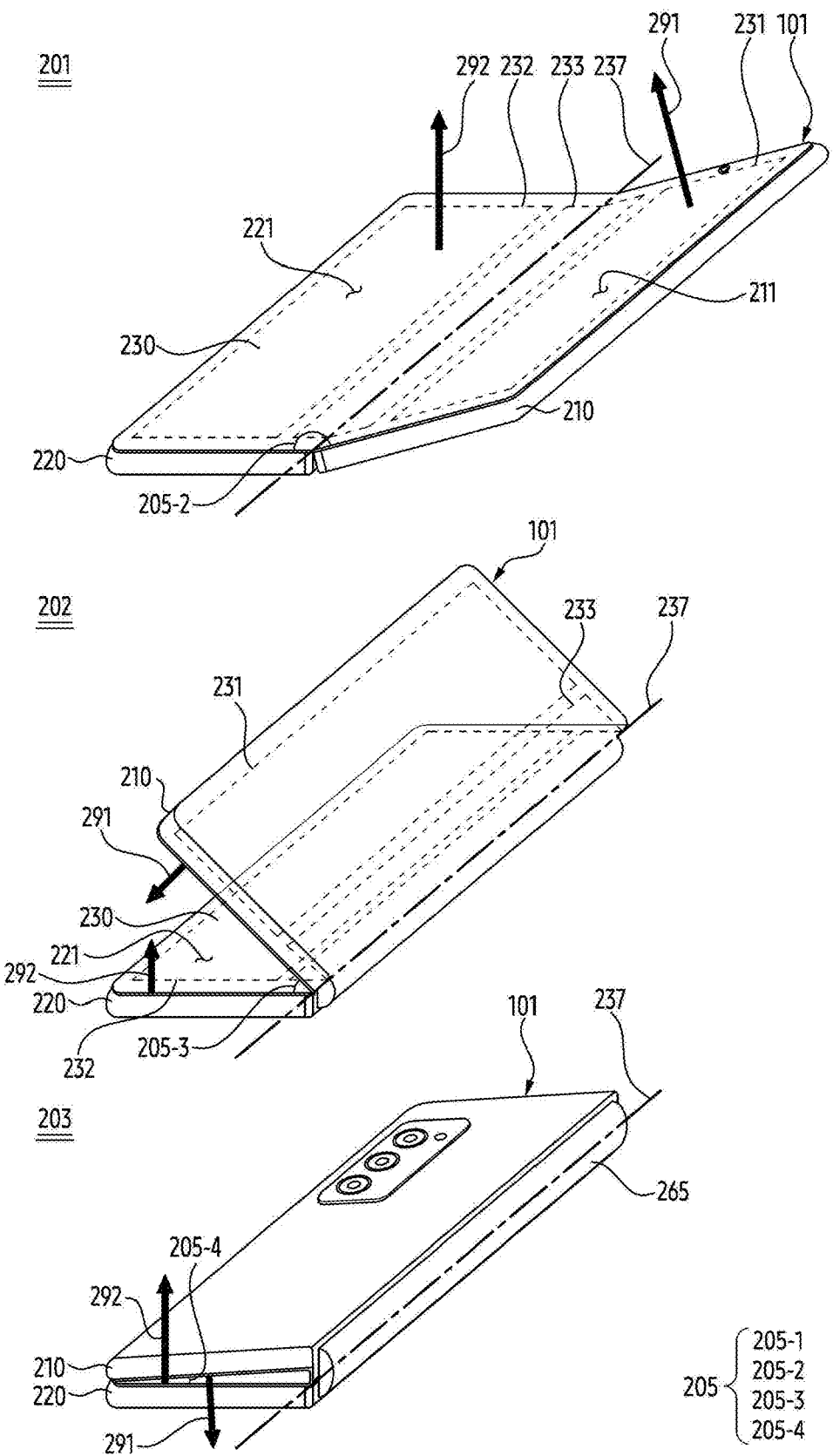

According to an embodiment, the flexible display 150 may be controlled by a controller such as the processor 120 to output visualized information to a user. The flexible display 150 may include a flat panel display (FPD) and/or electronic paper. The FPD may include a liquid crystal display (LCD), a plasma display panel (PDP), and/or one or more light emitting diodes (LEDs). The LED may include an organic LED (OLED). In FIGS. 2A and 2B, a locational relationship between a first housing and a second housing of the electronic device 101 including the deformable flexible display 150 will be described later. For example, the flexible display 150 may be used to display a screen obtained by the processor 120 or a screen obtained by a display driving circuit. For example, the electronic device 101 may display the screen on one portion of the flexible display 150 according to control of the display driving circuit. For example, the electronic device 101 may display the screen on the portion based on an angle at which the flexible display 150 is bent. However, the disclosure is not limited thereto. An operation in which the electronic device 101 displays a screen in a portion of the flexible display 150 based on the angle will be described later in FIG. 3.

According to an embodiment, the flexible display 150 may include at least one of a cover panel (C-panel) for protecting the flexible display 150, a base substrate, a thin film transistors (TFT) layer formed on the base substrate, a pixel layer (or an organic light emitting layer) including pixels emitted based on a voltage applied from the thin film transistors layer, or a polarization layer disposed on the pixel layer. For example, the substrate may be formed of a plurality of layers. The polarization layer may improve clarity of an image displayed through the flexible display 150 by imparting directionality to light emitted from a portion (e.g., a pixel layer) of the flexible display 150. For example, the flexible display 150 may further include a window disposed on the polarization layer. For example, the flexible display 150 may not include the polarization layer. For example, in case that the flexible display 150 does not include the polarization layer, the flexible display 150 may further include a color filter layer for enhancing color purity and a black matrix (BM) layer for preventing and/or reducing light reflection on the thin film transistors layer to enhance visibility. For example, the flexible display 150 may further include the color filter layer and a black pixel define layer (PDL). For example, the electronic device 101 may display a screen within a portion of the flexible display 150. For example, the screen may cause at least one image in a window disposed in a different portion from the portion based on an angle between the first housing and the second housing of the electronic device 101. The image may be an example of an image in which the screen is reflected based on the window.

According to an embodiment, the flexible display 150 of the electronic device 101 may include a sensor (e.g., a touch sensor panel (TSP)) for detecting an external object (e.g., a finger of a user) on the flexible display 150. For example, based on the TSP, the electronic device 101 may detect an external object that is in contact with the flexible display 150 or floating on the flexible display 150. In response to detecting the external object, the electronic device 101 may execute a function associated with a specific visual object (e.g., a screen) corresponding to a location of the external object on the flexible display 150 among visual objects displayed in the flexible display 150. As an example, the electronic device 101 may map an input corresponding to a first point of the flexible display 150 with an input corresponding to a second point different from the first point. An operation of mapping the input will be described later in FIGS. 5A to 5B.

According to an embodiment, the sensor 160 of the electronic device 101 may generate electronic information that is capable of being processed by the processor 120 and/or the memory 130 from non-electronic information associated with the electronic device 101. The electronic information generated by the sensor 160 may be stored in the memory 130, processed by the processor 120, and/or transmitted to another electronic device distinct from the electronic device 101. An embodiment of the electronic device 101 is not limited to a type and/or the number of one or more sensors illustrated in FIG. 1. For example, the sensor 160 may include a Global Positioning System (GPS) sensor for detecting a geographic location of the electronic device 101 and an illuminance sensor that measures brightness of ambient light.

According to an embodiment, the sensor 160 of the electronic device 101 may detect a state (e.g., a folding state or an unfolding state) of the electronic device 101 or an external environmental state. The electronic device 101 may generate, from the sensor 160, an electrical signal or a data value corresponding to the detected state. For example, the sensor 160 may include at least one hall sensor 161.

According to an embodiment, the hall sensor 161 may include one or more magnets and/or one or more magnetic sensors. At least one of the one or more magnets or the one or more magnetic sensors included in the hall sensor 161 may be disposed at different locations in the electronic device 101. A locational relationship of the one or more magnets and/or the one or more magnetic sensors in the electronic device 101 may be changed according to a shape of the electronic device 101. The electronic device 101 may measure a change in the locational relationship through the one or more magnetic sensors. The change in the locational relationship may cause a change in a magnetic field formed by the one or more magnets. The electronic device 101 may obtain a power signal indicating a change in the magnetic field using the hall sensor 161. For example, the electronic device 101 may distinguish a posture or a state (e.g., a folding state or an unfolding state) using the power signal obtained from the hall sensor 161. For example, the electronic device 101 may receive data indicating a state of the electronic device 101 from the hall sensor 161. For example, the hall sensor 161 may output data indicating a shape of the flexible display 150. The shape of the flexible display 150 may be changed by being folded or unfolded by a folding axis (e.g., a folding axis 237 of FIG. 2A). For example, the hall sensor 161 may output different data indicating the shape of the flexible display 150. For example, the electronic device 101 may identify an angle between the first housing and the second housing of the electronic device 101 based on the different data. The electronic device 101 may display a screen in a portion of the flexible display 150 based on the identified angle. The electronic device 101 may map an input received through the portion as an input received through a portion different from the portion while displaying the screen within the portion. As an example, according to the identified angle, a location where the electronic device 101 maps the input may be different. An operation in which the electronic device 101 changes a mapping location of an input according to the angle will be described later in FIG. 6.

According to an embodiment, the sensor 160 of the electronic device 101 may include an acceleration sensor 162 for measuring physical movement of the electronic device 101. For example, the acceleration sensor 162 may output electronic information indicating magnitude of gravitational acceleration measured in each of a plurality of specified axes (e.g., an x-axis, a y-axis, and a z-axis) perpendicular to each other. For example, the processor 120 of the electronic device 101 may measure a posture of the electronic device 101 in a physical space based on electronic information outputted from the acceleration sensor 162. The posture measured by the electronic device 101 may indicate an orientation of the electronic device 101 and/or a shape (e.g., a shape of the electronic device 101 deformed by an external force to be described later in FIG. 2A to FIG. 2B) of the electronic device 101 measured by the acceleration sensor 162. The electronic device 101 may determine a mode of the electronic device 101 based on the measured posture. The electronic device 101 may adjust a size or a location of a screen displayed in the flexible display 150 based on the determined mode. For example, the electronic device 101 may measure electronic information indicating the shape of the electronic device 101, using another sensor (e.g., the hall sensor 161) that is distinct from the acceleration sensor 162. For example, the electronic device 101 may identify a portion on which at least one screen is displayed on the flexible display 150 based on the posture of the electronic device 101, using the acceleration sensor 162.

Although not illustrated, the electronic device 101 according to an embodiment may further include a plurality of sensors. For example, the electronic device 101 may include a geomagnetic sensor. For example, the geomagnetic sensor may output electronic information indicating magnitude of a magnetic flux measured in each of the plurality of specified axes (e.g., the x-axis, the y-axis, and the z-axis) perpendicular to each other. For example, the electronic device 101 may obtain information on an orientation of the electronic device 101, using the geomagnetic sensor. According to an embodiment, the electronic device 101 may include a gyro sensor. For example, the gyro sensor may output electronic information indicating movement and/or rotation of the electronic device 101. The electronic device 101 may obtain information indicating a location of housings of the electronic device 101, using the gyro sensor.

As described above, the electronic device 101 may identify the angle between the first housing and the second housing of the electronic device 101 using the sensor 160. The electronic device 101 may display a screen on a portion of the flexible display 150 based on the identified angle. For example, while the angle is included within a specified range associated with an acute angle, the electronic device 101 may provide a user experience based on a characteristic in which a screen of a first portion on the first housing of the flexible display 150 is reflected in a second portion on the second housing. The electronic device 101 may prevent/reduce leakage of private information of a user, by displaying a screen displayed within a relatively narrow viewing angle based on the characteristic. In FIG. 2A and FIG. 2B, a folding state and/or an unfolding state of the electronic device will be described in greater detail.

FIGS. 2A and 2B are perspective views illustrating an example of a locational relationship between a first housing and a second housing in an unfolding state and a folding state of an electronic device according to various embodiments. An electronic device 101 may be referred to the electronic device 101 of FIG. 1. A flexible display 230 may be referred to the flexible display 150 of FIG. 1. A first housing 210, a second housing 220, and a folding housing 265 may be included in the electronic device 101. At least a portion of the flexible display 230 may be disposed on a surface (e.g., a first surface 211) of the first housing 210 and a surface (e.g., a second surface 221) of the second housing. A first display area 231, a second display area 232, and a third display area 233 may be included in the flexible display 230. The folding housing 265 may be referred to a hinge structure.

Referring to FIG. 2A, the electronic device 101 according to an embodiment may provide an unfolding state in which the first housing 210 and the second housing 220 are fully folded out by the folding housing 265. For example, the electronic device 101 may be in a state 200, which is the unfolding state. For example, the state 200 may represent a state in which a direction 291 of the first housing facing the first surface 211 corresponds to a direction 292 of the second housing facing the second surface 221. For example, in the state 200, the direction 291 of the first housing may be parallel to the direction 292 of the second housing. For example, the direction 291 of the first housing in the state 200 may be the same as the direction 292 of the second housing.

According to an embodiment, in the state 200, the first surface 211 may form substantially one plane with the second surface 221. For example, in the state 200, an angle 205-1 between the first surface 211 and the second surface 221 may be 180 degrees. For example, the state 200 may represent a state capable of providing all of an entire display area of the flexible display 230 on the substantially one plane. For example, the state 200 may represent a state capable of providing all of the first display area 231, the second display area 232, and the third display area 233 on one plane. For example, in the state 200, the third display area 233 may not include a curved surface. For example, the unfolding state may be referred to as an outspread state (or outspreading state). As an example, in the unfolding state, the electronic device 101 may display a screen using the display areas 231, 232, and 233 of the flexible display 230 based on at least one application. In a state different from the unfolding state, the electronic device 101 may display a different screen associated with the screen in one of the first display area 231, the second display area 232, or the third display area 233. Hereinafter, the description of the different state will be described later.

Referring to FIG. 2B, the electronic device 101 according to an embodiment may provide a folding state in which the first housing 210 and the second housing 220 are folded in by the folding housing 265. For example, the electronic device 101 may be in the folding state including a state 201, a state 202, and a state 203. For example, the folding state including the state 201, the state 202, and the state 203 may represent a state in which the direction 291 of the first housing facing the first surface 211 is distinct from the direction 292 of the second housing facing the second surface 221. For example, the folding state may represent a state in which locations of the first housing 210 and the second housing 220 are deformed based on a folding axis 237. The electronic device 101 may identify the state using a sensor (e.g., the sensor 160 of FIG. 1). For example, in the state 201, an angle between the direction 291 of the first housing and the direction 292 of the second housing may be 45 degrees, and the direction 291 of the first housing and the direction 292 of the second housing may be distinguished from each other. For example, in the state 202, an angle between the direction 291 of the first housing and the direction 292 of the second housing may be 120 degrees, and the direction 291 of the first housing and the direction 292 of the second housing may be distinguished from each other. For example, in the state 203, an angle between the direction 291 of the first housing and the direction 292 of the second housing may be substantially 180 degrees, and the direction 291 of the first housing and the direction 292 of the second housing may be distinguished from each other.

According to an embodiment, in the folding state, an angle between the first surface 211 and the second surface 221 may be equal to or greater than 0 degrees and less than 180 degrees. For example, in the state 201, an angle 205-2 between the first surface 211 and the second surface 221 may be 135 degrees. In the state 202, an angle 205-3 between the first surface 211 and the second surface 221 may be 60 degrees. In the state 203, an angle 205-4 between the first surface 211 and the second surface 221 may be substantially 0 degrees. For example, the folding state may be referred to as a folded state.

In an embodiment, the folding state may include a plurality of sub folding states. For example, referring to FIG. 2B, the folding state may include the plurality of sub folding states, including the state 203, which is a fully folding state in which the first surface 211 is substantially overlapped on the second surface 221 by rotation provided through the folding housing 265, and the state 201 and the state 202, which are an intermediate folding state between the state 203 and the unfolding state (e.g., the state 200 of FIG. 2A). For example, as the first surface 211 and the second surface 221 face each other by the folding housing 265, the electronic device 101 may provide the state 203 in which an entire area of the first display area 231 is substantially fully overlapped on an entire area of the second display area 232. For example, the electronic device 101 may provide the state 203 in which the direction 291 of the first housing is substantially opposite to the direction 292 of the second housing. For example, the state 203 may also represent a state in which the flexible display 230 is covered within a field of view of a user looking at the electronic device 101. However, the disclosure is not limited thereto.

According to an embodiment, the flexible display 230 may be bent by rotation provided through the folding housing 265. For example, in the flexible display 230, unlike the first display area 231 and the second display area 232, the third display area 233 may be bent according to a folding operation. For example, the third display area 233 may be in a curvedly bent state to prevent and/or reduce damage to the flexible display 230 within the fully folding state. In the fully folding state, unlike the third display area 233 being curvedly bent, an entire first display area 231 may be fully overlapped on an entire second display area 232.

According to an embodiment, the electronic device 101, in the state 200, may display a screen using all of the first display area 231, the second display area 232, and the third display area 233 of the flexible display 230 based on one of a plurality of applications stored in the memory (e.g., the memory 130 of FIG. 1). For example, the electronic device 101 may identify an angle (e.g., the angle 205-3) between the first housing 210 and the second housing 220, using the sensor (e.g., the sensor 160 of FIG. 1). The electronic device 101 may reduce and display the screen within a portion of the flexible display 230 based on the identified angle. While the screen is reduced and displayed in the portion, the electronic device 101 may display another screen causing reflection of a screen displayed in the portion in another portion of the flexible display 230 different from the portion. While the screen is reduced and displayed in the portion, the electronic device 101 may match and display an upper end of the reduced screen with the folding axis 237. An operation in which the electronic device 101 displays the screen and the different screen will be described in greater detail below with reference to FIG. 3.

Figure 3:
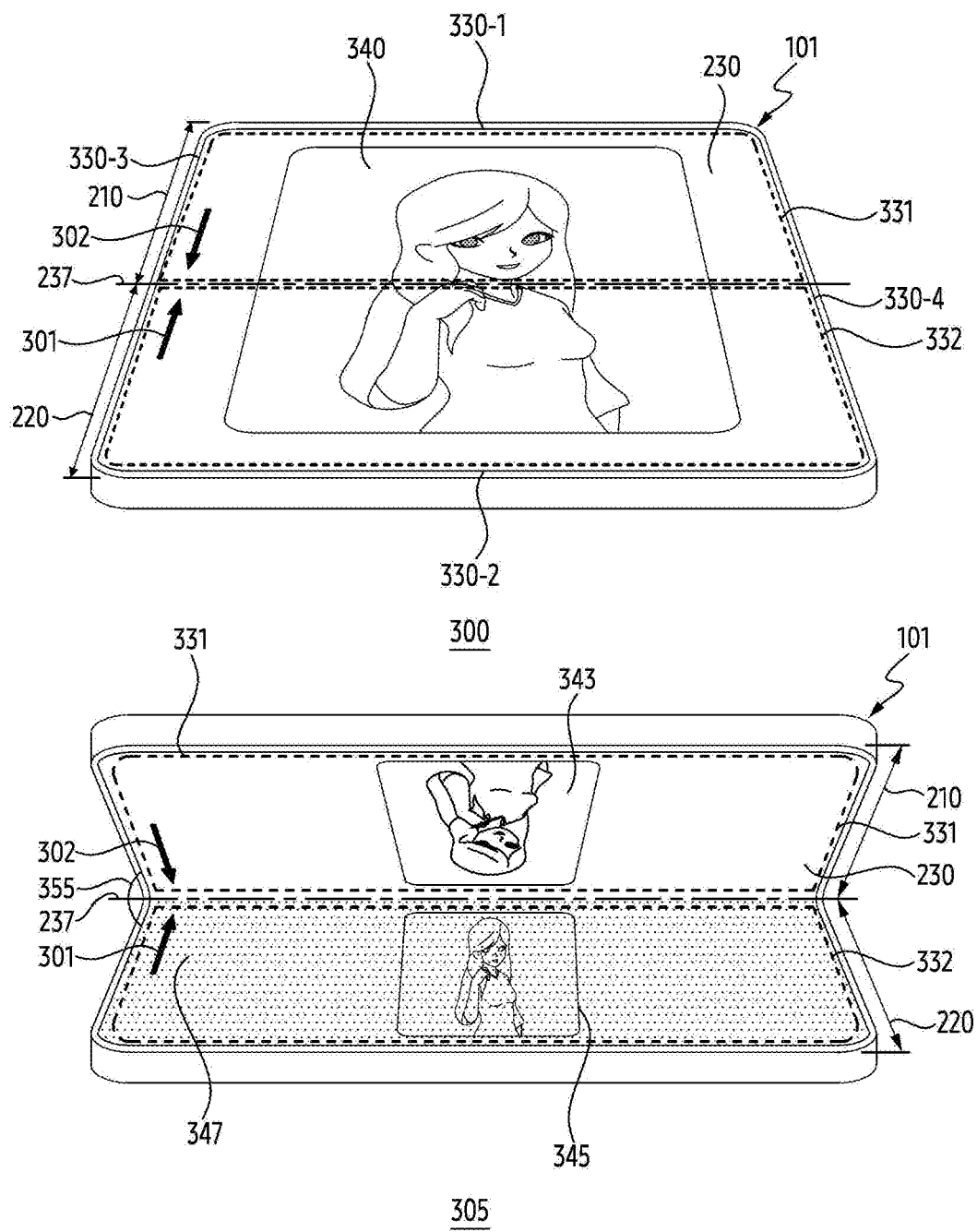
FIG. 3 includes perspective views illustrating an example of a screen displayed based on an angle between a first housing and a second housing within an unfolding state and a folding state of an electronic device according to various embodiments.

FIG. 3 includes perspective views illustrating an example of a screen displayed based on an angle between a first housing and a second housing within an unfolding state and a folding state of an electronic device according to various embodiments. A state 300 may include an electronic device 101 in an unfolding state (e.g., the state 200 of FIG. 2A). The electronic device 101 may be referred to the electronic device 101 of FIG. 1. A first housing 210 may be referred to the first housing 210 of FIG. 2A. A second housing 220 may be referred to the second housing 220 of FIG. 2A. A folding axis 237 may be referred to the folding axis 237 of FIG. 2A. A first portion 331 may include a portion disposed in the first housing (e.g., the first housing 210 of FIG. 2A), which is divided by a folding axis (e.g., the folding axis 237 of FIG. 2A) among the first display area 231 of FIG. 2A and the third display area 233 of FIG. 2A. A second portion 332 may include a portion different from the portion among the second display area 232 of FIG. 2A and the third display area 233 of FIG. 2A. The first portion 331 and the second portion 332 may be included in a flexible display 230. The flexible display 230 may be referred to the flexible display 150 of FIG. 1. The flexible display 230 may include, in the state 300, a first edge 330-1 of the electronic device 101, a second edge 330-2 facing away from the first edge 330-1, a third edge 330-3 extending an end of the first edge 330-1 and an end of the second edge 330-2, and a fourth edge 330-4 extending another end of the first edge 330-1 and another end of the second edge 330-3.

Referring to FIG. 3, the electronic device 101 according to an embodiment may display, in the state 300, a screen 340 based on a first direction 301, using all of the first portion 331 and the second portion 332. For example, an upper end of the screen 340 may be the first edge 330-1 among the first edge 330-1 or the second edge 330-2. In the state 300, the electronic device 101 may match the upper end of the screen 340 to any one of the first edge 330-1, the second edge 330-2, the third edge 330-3, or the fourth edge 330-4 based on a sensor (e.g., the sensor 160 of FIG. 1). For example, the electronic device 101 may display the screen 340 based on one application of a plurality of applications stored in a memory (e.g., the memory 130 of FIG. 1). As an example, the screen 340 may be an activity displayed based on the application. As an example, the screen 340 may be an example of a user interface (UI) displayed based on the application.

While displaying the screen 340, the electronic device 101 according to an embodiment may identify an angle 355 between the first housing 210 and the second housing 220, using the sensor. The electronic device 101 may display, based on the angle 355, a screen 343 in the first portion 331, based on a second direction 302 associated with the screen 340 and different from the first direction 301. For example, the angle 355 may be included in a specified range associated with an acute angle. As an example, the specified range may include a range between 20 degrees and 60 degrees. For example, an upper end of the screen 343 may be the folding axis 237. For example, a lower end of the screen 343 may be the first edge 330-1. For example, the screen 343 may be an example of a screen in which a size of the screen 340 is adjusted. For example, the screen 343 may be an example of a screen in which the upper end and the lower end of the screen 340 are inverted. However, the disclosure is not limited to the above-described embodiment. For example, the electronic device 101 may display the screen 343 in the second portion 332 using the sensor. For example, the electronic device 101 may obtain a plurality of values based on acceleration sensors (e.g., the acceleration sensor 162 of FIG. 1) included in each of the first housing 210 and the second housing 220. For example, the electronic device 101 may identify a portion (e.g., the first portion 331 or the second portion 332) for displaying the screen 343, using the values. While displaying the screen 343 in the identified portion, the electronic device 101 may receive at least one input, using a portion different from the portion. An operation of obtaining a plurality of values using the acceleration sensors will be described in greater detail below with reference to FIG. 4A and FIG. 4B.

According to an embodiment, the electronic device 101, in a state 305, may identify the angle 355, using the sensor. The state 305 may include the electronic device 101 in a sub folding state (e.g., the state 202 of FIG. 2B). For example, the electronic device 101 may display the screen 343 in the first portion 331 based on identifying the angle 355 included in a specified range. For example, the specified range may include an angle that causes the screen 343 displayed in the first portion 331 to be reflected by the second portion 332. For example, the specified range may include an angle that causes occurrence of reflection of the screen 343 displayed in the first portion 331, onto the second portion 332. For example, the specified range may include an angle that makes an image 345 in a window included in the second portion 332 by the screen 343 displayed in the first portion 331. As an example, the image 345 may be a virtual image. As an example, a location and a size of the image 345 may vary based on the angle 355. For example, a first specified angle may be a lower limit of the specified range, and a second specified angle may be an upper limit of the specified range. For example, an upper end of the image 345 may be the folding axis 237.

The electronic device 101 according to an embodiment may identify, in the unfolding state (e.g., the state 200 of FIG. 2A), that the angle 355 is decreased to be equal to or less than the second specified angle (e.g., 60 degrees), using the sensor. Based on identifying the angle 355 decreased to be equal to or less than the second specified angle, in the state 305, the electronic device 101 may display the screen 343, in the first portion 331, associated with the screen 340 and based on the second direction 302 different from the first direction 301. For example, the electronic device 101 may identify, in the state 305, that the angle 355 is increased to be equal to or greater than the second specified angle, using the sensor. The electronic device 101 may display the screen 340 in the flexible display 230 based on identifying that the angle 355 is increased to be equal to or greater than the second specified angle.

According to an embodiment, the electronic device 101 may identify a location of the first housing 210 and/or the second housing 220, using the sensor (e.g., the sensor 160 of FIG. 1). For example, the electronic device 101 may identify an angle between the first housing 210 and the ground, or an angle between the second housing 220 and the ground, using the sensor. Based on the angles, the electronic device 101 may identify at least one housing parallel to the ground among the first housing 210 or the second housing 220. As an example, the electronic device 101 may display the screen 343 in a portion included in a housing not parallel to the ground based on identifying the at least one housing parallel to the ground. While displaying the screen 343, the electronic device 101 may receive an input, using a portion different from the portion included in the at least one housing parallel to the ground. As an example, while displaying the screen 343 in the first portion 331, the electronic device 101 may receive an input, using the second portion 332. As an example, the electronic device 101 may receive an input through the first portion 331, while displaying the screen 343 in the second portion 332. However, the disclosure is not limited to the above-described embodiment. As an example, the image 345 may appear in the first portion 331, based on the screen 343 displayed in the second portion 332. As an example, the electronic device 101 may change a portion on which the screen 343 is displayed based on identifying movement of the electronic device 101, using an acceleration sensor (e.g., the acceleration sensor 162 of FIG. 1).

According to an embodiment, the electronic device 101 may adjust brightness of the flexible display 230 based on an identified angle 355, using a sensor. For example, the electronic device 101 may control the brightness of the flexible display 230 based on first brightness in the state 300. For example, the electronic device 101 may control the brightness of the flexible display 230 based on second brightness different from the first brightness in the state 305. As an example, the second brightness may be an example of brightness that causes the screen 343 displayed in the first portion 331 of the electronic device 101 to be reflected by the second portion 332.

According to an embodiment, the electronic device 101 may display a screen 347 in the second portion 332 while displaying the screen 343 in the first portion 331. For example, the screen 347 may be an example of a black screen and/or an opaque screen (e.g., a dim layer). For example, alternatively, the electronic device 101 may deactivate displaying the screen 347 and at least a portion of a plurality of pixels included in the second portion 332. For example, the image 345 may appear by the screen 347 facing the screen 343 based on the angle 355 between the first housing 210 and the second housing 220 of the electronic device 101. For example, the image 345 may be an image based on the first direction 301. For example, the image 345 may be an image in which the screen 343 based on the second direction 302 is inverted vertically based on the folding axis 237.

According to an embodiment, the electronic device 101 may receive an input, using the second portion 332. Based on the received input, the electronic device 101 may control the screen 343 displayed in the first portion 331. An operation in which the electronic device 101 controls the screen displayed in the first portion 331 based on the received input will be described in greater detail below with reference to FIG. 5A and FIG. 5B.

As described above, the electronic device 101 may display, based on an angle of the housing, in the unfolding state, a second screen (e.g., the screen 343) associated with a first screen (e.g., the screen 340) displayed based on the first direction 301 and based on the second direction 302, on a portion (e.g., the first portion 331) of the flexible display. A user of the electronic device may identify the second screen 343 through the image 345 displayed in a portion different from the portion. The user of the electronic device may identify a screen (e.g., the screen 343) based on the first direction 301 through a reflected image 345 based on the folding axis 237 through the second portion 332. The electronic device 101 may provide a more diverse user experience to the user of the electronic device, by providing a user interface based on reflection generated from the flexible display such as the image 345 according to the angle.

Figure 4A:
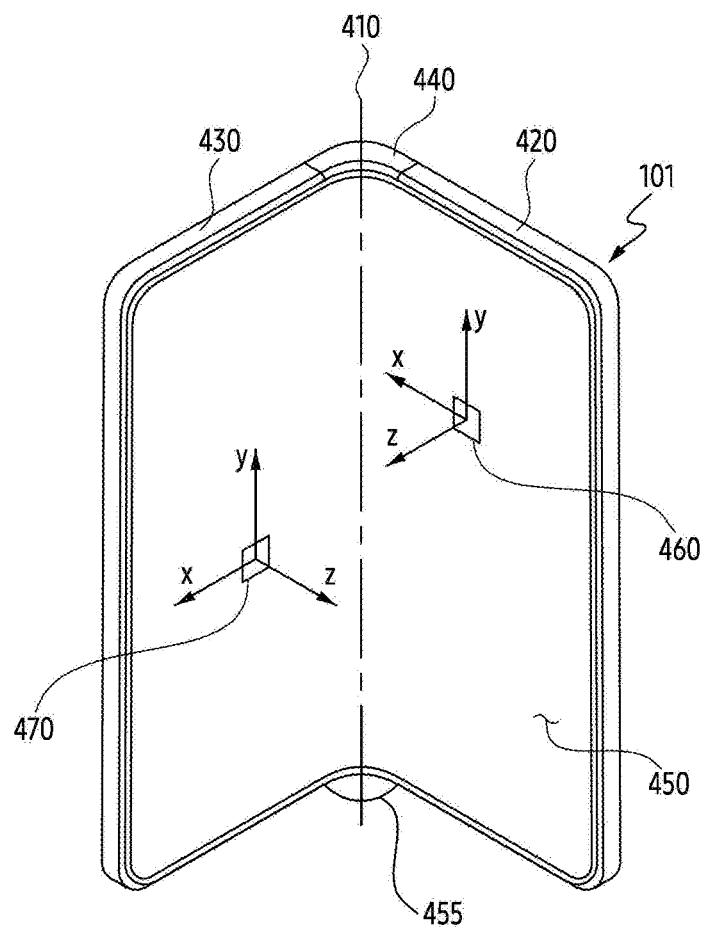
FIGS. 4A and 4B are perspective views illustrating an example of locations of a plurality of acceleration sensors in an electronic device according to various embodiments.
Figure 4B:
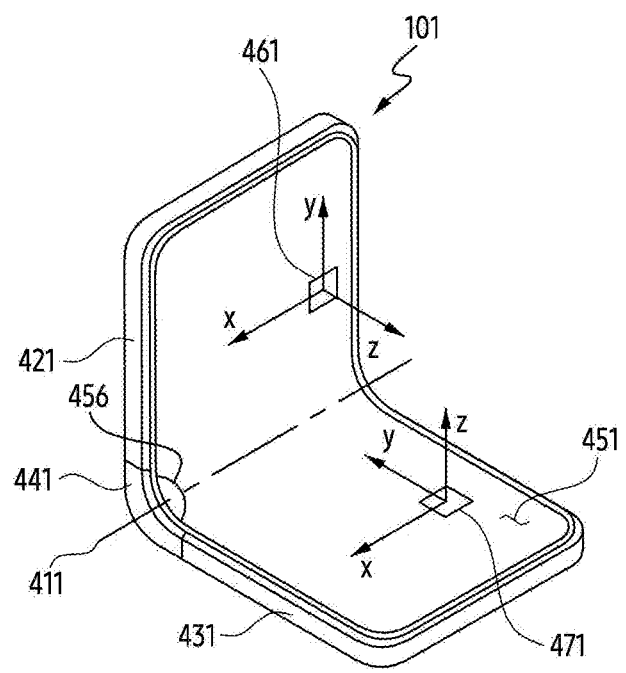

FIGS. 4A and 4B are perspective views illustrating example locations of a plurality of acceleration sensors in an electronic device according to various embodiments. An electronic device 101 of FIG. 4A and an electronic device 101 of FIG. 4B may be an example of the electronic device 101 of FIG. 1 having a different shape. Referring to FIGS. 4A and 4B, examples of the electronic device distinguished by a shape and/or a structure of a housing are illustrated. The electronic device of FIGS. 4A to 4B may be a terminal that is owned by different users. For example, the electronic device 101 may include a deformable housing (e.g., the first housing 210 of FIG. 2A, the second housing 220 of FIG. 2A, and the folding housing 265 of FIG. 2A) based on at least one folding axis. Acceleration sensors 460, 461, 470, and 471 may be referred to the acceleration sensor 162 of FIG. 1. First housings 420 and 421 may be referred to the first housing 210 of FIG. 2A. Second housings 430 and 431 may be referred to the second housing 220 of FIG. 2A. Folding housings 440 and 441 may be referred to the folding housing 265 of FIG. 2A. Folding axes 410 and 411 may be referred to the folding axis 237 of FIG. 2A. Flexible displays 450 and 451 may be referred to the flexible display 150 of FIG. 1. Angles 455 and 456 may be referred to the angle 355 of FIG. 3.

Referring to FIG. 4A, the deformable housing of the electronic device 101 according to an embodiment may be distinguished by a folding housing 440 including a folding axis 410, and a first housing 420 and a second housing 430 connected to the folding housing 440. According to an embodiment, a flexible display 450 of the electronic device 101 may be an example of a display disposed across the first housing 420 and the second housing 430.

According to an embodiment, the electronic device 101 may include acceleration sensors 460 and 470 disposed in each of the first housing 420 and the second housing 430. The acceleration sensors 460 and 470 may be included in the electronic device 101 to measure a shape and/or a posture of the electronic device 101. Each of the acceleration sensors 460 and 470 may be included in a six-axis motion sensor including an acceleration sensor based on three axes of a +x-axis, a +y-axis, and a +z-axis of FIG. 4A, and a gyro sensor based on the three axes. The acceleration sensors 460 and 470 may identify acceleration applied to each of the three axes. The acceleration may be a vector based on a direction and/or magnitude of a net force applied to the electronic device 101. For example, the acceleration may be a vector indicating an amount of change in speed of the electronic device 101 due to the net force. The net force applied to the electronic device 101 may include gravity, or a combination of another force (e.g., a force applied to the electronic device 101 by a user holding the electronic device 101) distinct from the gravity. According to an embodiment, the acceleration sensors 460 and 470 of the electronic device 101 may identify rotation of the acceleration sensor based on the one or more axes. According to an embodiment, the electronic device 101 may identify movement of the electronic device 101 based on the acceleration and/or the rotation identified by each of the acceleration sensors 460 and 470.

Using the acceleration sensors 460 and 470 according to an embodiment, the electronic device 101 may obtain an angle 455 between the first housing 420 and the second housing 430, and the folding axis 410. Based on the angle 455, the electronic device 101 may identify a state (e.g., a folding state, an unfolding state, or a sub unfolding state) of the electronic device 101. For example, referring to FIG. 4A, the electronic device 101 may identify the angle 455 between the first housing 420 and the second housing 430, using the acceleration sensors 460 and 470. For example, in a state in which the second housing 430 is fixed, the electronic device 101 may obtain values of the three axes of the +x-axis, the +y-axis, and the +z-axis of FIG. 4A, using the acceleration sensor 460 included in the first housing 420. For example, the electronic device 101 may identify a location of the first housing 420 or the angle 455 between the first housing 420 and the second housing 430, using the obtained values. For example, the electronic device 101 may identify the angle 455 included in a specified range. The specified range may be equal to or greater than 20 degrees and equal to or less than 60 degrees. For example, the electronic device 101 may display at least one screen in a portion of the flexible display 450 based on the identified angle 455. While displaying the at least one screen, the electronic device 101 may receive an input through a portion different from the portion. An operation in which the electronic device 101 receives the input will be described later in FIG. 5A to FIG. 5B.

According to an embodiment, the electronic device 101 may identify movement of the electronic device 101, while displaying the at least one screen in a portion of the flexible display 450, using the acceleration sensors 460 and 470. For example, the electronic device 101 may identify an angle between the first housing 420 and the ground, or an angle between the second housing 430 and the ground, based on the identified movement. Based on the angles, the electronic device 101 may identify at least one housing parallel to the ground among the first housing 420 or the second housing 430. As an example, the electronic device 101 may identify movement of the electronic device 101, while displaying a screen in a portion of the flexible display disposed in the first housing 420. As an example, based on the identified movement, the electronic device 101 may identify the first housing 420 parallel to the ground. The electronic device 101 may display the screen in a portion different from the portion disposed in the second housing 430 based on identification of the first housing 420 parallel to the ground. However, the disclosure is not limited to the above-described embodiment.

According to an embodiment, a shape of the electronic device 101 is not limited to the embodiment of FIG. 4A in which the folding axis 410 is formed parallel to a length among a width and the length shorter than the width of the flexible display 450. Referring to FIG. 4B, an example of the electronic device 101 including a flexible display 451 having a width and a length longer than the width, and a folding axis 411 formed parallel to the width is illustrated. A deformable housing of the electronic device 101 may include a folding housing 441 including the folding axis 411, and a first housing 421 and a second housing 431 distinguished by the folding axis 411. The electronic device 101 may include acceleration sensors 461 and 471 disposed in each of the first housing 421 and the second housing 431. The electronic device 101 may obtain an angle 456 between the first housing 421 and the second housing 431, and the folding axis 411, using the acceleration sensors 461 and 471. Based on the angle 456, the electronic device 101 may identify a state of the electronic device 101. The electronic device 101 may identify the angle 456 included in a specified range. For example, based on the angle 456, the electronic device 101 may receive at least one input through a second portion (e.g., the second portion 332 of FIG. 3) while displaying a screen in a first portion (e.g., the first portion 331 of FIG. 3). For example, the electronic device 101 may receive at least one input through the first portion while displaying a screen in the second portion based on a first value obtained using the acceleration sensor 461 and a second value obtained using the acceleration sensor 471.

In an embodiment, the acceleration sensors 461 and 471 included in the electronic device 101 may be disposed on printed circuit boards (PCBs) included in each of the first housing 421 and the second housing 431. Among the PCBs, a PCB on which a processor (e.g., the processor 120 of FIG. 1) is disposed may be referred to as a main board. Among the PCBs, another PCB different from a PCB, which is a main board, may be referred to as a sub board. Among the acceleration sensors 461 and 471, an acceleration sensor disposed on the main board may be referred to as a main acceleration sensor (e.g., a main 6-axis acceleration sensor), and another acceleration sensor may be referred to as a sub acceleration sensor (e.g., a sub-6 axis acceleration sensor).

According to an embodiment, the electronic device 101 may identify movement of the electronic device 101, using the acceleration sensors 460, 461, 470, and 471. For example, the electronic device 101 may identify a curved angle of the flexible displays 450 and 451, using the acceleration sensors 460, 461, 470, and 471. For example, the electronic device 101 may identify one of the first housings 420 and 421 and/or the second housings 430 and 431 parallel to the ground, using a sensor different from the sensors. Based on the identified one, the electronic device 101 may display a screen (e.g., the screen 343 of FIG. 3) in a portion of the flexible display included in a housing not parallel to the ground.

As described above, the electronic device 101 may identify the angles 455 and 456 included in a specified range associated with an acute angle, using the acceleration sensors 460, 461, 470, and 471. The electronic device 101 may identify the first housings 420 and 421 and/or the second housings 430 and 431 parallel to the ground based on the identified angles 455 and 456. The electronic device 101 may display a screen within a portion of the flexible displays 450 and 451 included in the housing not parallel to the ground. While displaying the screen, the electronic device 101 may identify movement of the electronic device 101, using the acceleration sensors 460, 461, 470, and 471 of the electronic device 101. The electronic device 101 may identify a housing parallel to the ground based on the identified movement. For example, in case that a housing including the portion on which the screen is displayed is parallel to the ground, the electronic device 101 may display in a different portion of a housing different from the housing, by replacing the screen. The electronic device 101 may provide user convenience based on a characteristic of moving a screen using the acceleration sensors 460, 461, 470, and 471.

Figure 5A:
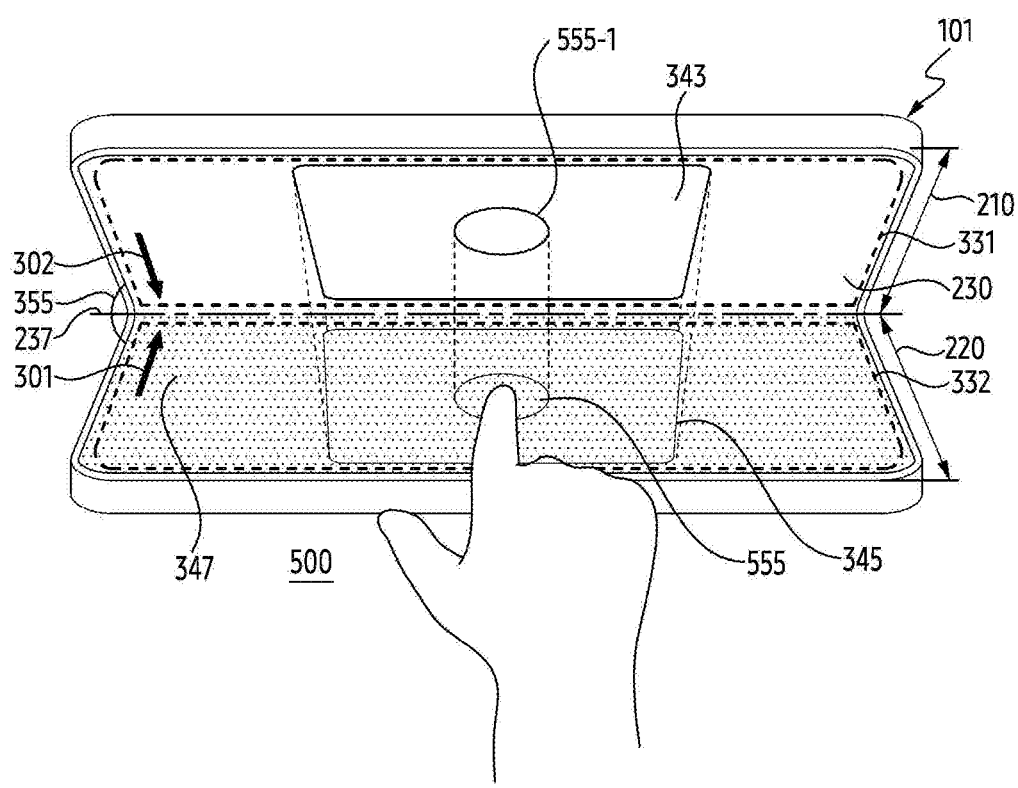
FIGS. 5A and 5B are perspective views illustrating an example of mapping between an input for a first portion and an input for a second portion of a flexible display according to various embodiments.
Figure 5B:
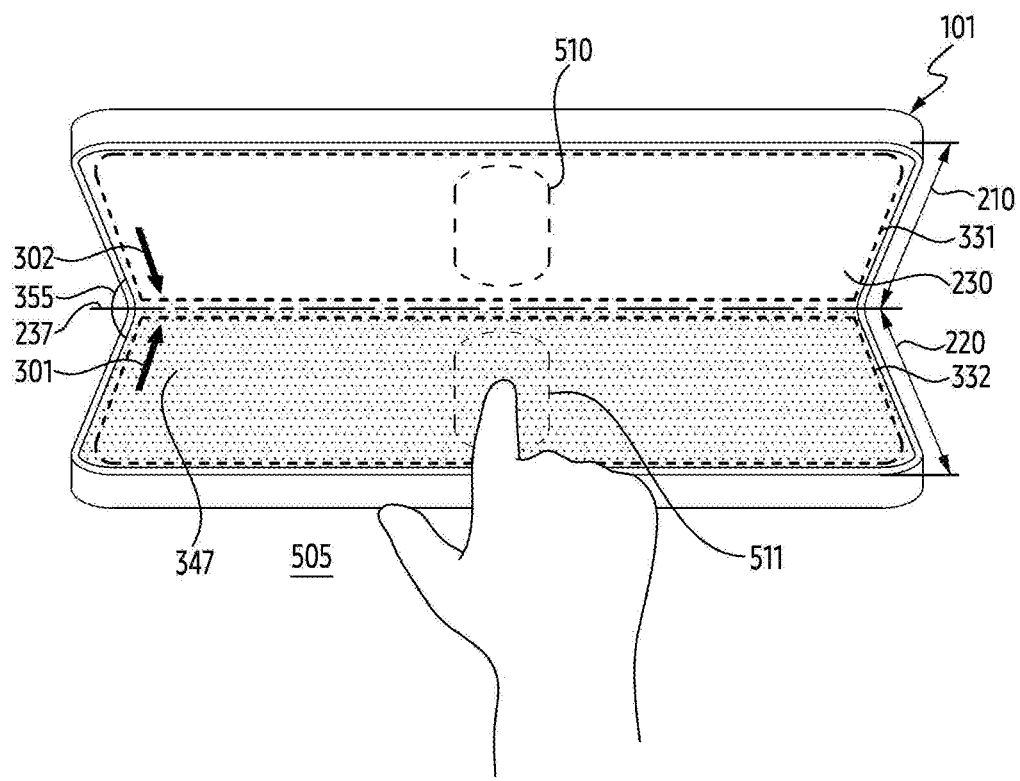

FIGS. 5A and 5B are perspective views illustrating an example of mapping between an input for a first portion and an input for a second portion of a flexible display according to various embodiments. A state 500 may include an electronic device 101. The electronic device 101 may be referred to the electronic device 101 of FIG. 1. A first housing 210 may be referred to the first housing 210 of FIG. 2A. A second housing 220 may be referred to the second housing 220 of FIG. 2A. A first portion 331 may be referred to the first portion 331 of FIG. 3. A second portion 332 may be referred to the second portion 332 of FIG. 3. A folding axis 237 may be referred to the folding axis 237 of FIG. 2A. A screen 343 may be referred to the screen 343 of FIG. 3. An image 345 may be referred to the image 345 of FIG. 3. An angle 355 may be referred to the angle 355 of FIG. 3.

Referring to FIG. 5A, in a sub folding state (e.g., the state 305 of FIG. 3) according to an embodiment, the electronic device 101 may display the screen 343 in the first portion 331 based on at least one application. An upper end of the screen 343 may be the folding axis 237. A lower end of the screen 343 may be an edge (e.g., the first edge 330-1 of FIG. 3) of the first housing 210. As an example, a portion on which the screen 343 is displayed may be changed based on a sensor of the electronic device 101. For example, the electronic device 101 may cause reflection of the screen 343 in the second portion 332 by a screen 347 based on the angle 355 (e.g., equal to or greater than 20 degrees and equal to or less than 60 degrees) between the first housing 210 and the second housing 220. The image 345 may appear in the second portion 332 by the caused reflection. The image 345 may be a virtual image. Based on the angle 355 between the first housing 210 and the second housing 220 of the electronic device 101, a location where the image 345 appears may be different.

According to an embodiment, the electronic device 101 may receive an input, using the second portion 332. For example, the electronic device 101 may deactivate at least one sensor included in the first portion 331, while receiving an input, using the second portion 332. The sensor may be an example (e.g., a TSP) of a sensor used by the electronic device 101 to receive an input. For example, the electronic device 101 may identify the received input as an input to the first portion 331, using the second portion 332. For example, the input may represent one of a tap input, a drag input, or a pinch input. As an example, the electronic device 101 may initiate execution of content based on receiving the tap input for the content within a screen. As an example, the electronic device 101 may move content within a screen based on receiving the drag input for the content included within the screen. As an example, the electronic device 101 may reduce and/or enlarge a screen displayed in a display (e.g., the flexible display 150 of FIG. 1) based on receiving the pinch input.

For example, the electronic device 101 may map an input to the second portion 332 as an input to the first portion 331 according to an angle between the first housing 210 and the second housing 220. For example, the electronic device 101 may map an input to a first point 555 in the second portion 332 of the flexible display as an input to a second point 555-1 in the first portion 331 different from the second portion 332, using a touch sensor panel (TSP). For example, a location of a point of the second portion 332 mapped to a point of the first portion 331 may be different according to the angle 355. As an example, in case that the angle between the first housing 210 and the second housing 220 is 20 degrees, the electronic device 101 may map a point in the first point 555 and the second portion. As an example, in case that the angle is 60 degrees, the electronic device 101 may map a different point in the first point 555 and the second portion. As an example, the point may be closer to the folding axis 237 based on the different point. According to the angle, an operation in which the electronic device 101 maps the first portion 331 and the second portion 332 will be described later in FIG. 6.

According to an embodiment, the electronic device 101 may receive an input for controlling a screen, while displaying the screen in the first portion 331, using the second portion 332. For example, the electronic device 101 may receive an input corresponding to a location where the image 345 appears on the second portion 332 while displaying the screen 343 in the first portion 331. For example, the electronic device 101 may identify the input to the first point 555 as the input to the second point 555-1. For example, a location of the second point 555-1 may be included in the screen 343. The electronic device 101 may execute a function based on the input to the second point 555-1. For example, the electronic device 101 may initiate execution of an application based on the input. The application may be an example of an application that requests a processor (e.g., the processor 120 of FIG. 1) of the electronic device 101 to display the screen 343.

Referring to FIG. 5B, the electronic device 101 according to an embodiment may receive various types of inputs in a state 505, using the flexible display (e.g., the flexible display 150 of FIG. 1). For example, the electronic device 101 may identify a swipe gesture through the flexible display. The swipe gesture may refer, for example, to an input that moves, in a straight line, from a point on the flexible display to a point different from the point. For example, the point and the different point may be included in a first area 511. For example, the electronic device 101 may not identify an input to the first area 511. For example, the electronic device 101 may deactivate at least one sensor included in the first area 511. For example, the electronic device 101 may receive an input to the first area 511 based on a first direction 301 through the second portion 332. As an example, the first direction 301 may be a direction from an edge (e.g., the second edge 330-2 of FIG. 3) of the flexible display (e.g., the flexible display 230 of FIG. 2) toward the folding axis 237. For example, the electronic device 101 may identify a received input to the first area 511 as an input to a second area 510, based on the second direction 302, with respect to the first portion 331. As an example, the second direction 302 may be a direction from an edge (e.g., the first edge 330-1 of FIG. 3) of the flexible display toward the folding axis 237. The electronic device 101 may execute a function based on the input on a screen displayed in the first portion 331. For example, the electronic device 101 may initiate a function of screen scrolling or screen switching based on the received input.

As described above, the electronic device 101 may identify the input to the second portion 332 as the input to the first portion 331. The electronic device 101 may control a screen (e.g., the screen 343 of FIG. 3) displayed in the first portion 331 through the second portion 332 based on an angle of the first housing 210 and the second housing 220. A user of the electronic device 101 may identify an image (e.g., the image 345 of FIG. 3) in which the screen is reflected on the second portion 332. According to an embodiment, the electronic device 101 may enable the user of the electronic device 101 to perform intuitive control based on an image, by executing a function of a screen based on a gesture on the image indicating the screen of the first portion 331 and reflected from the second portion 332.

Figure 6:
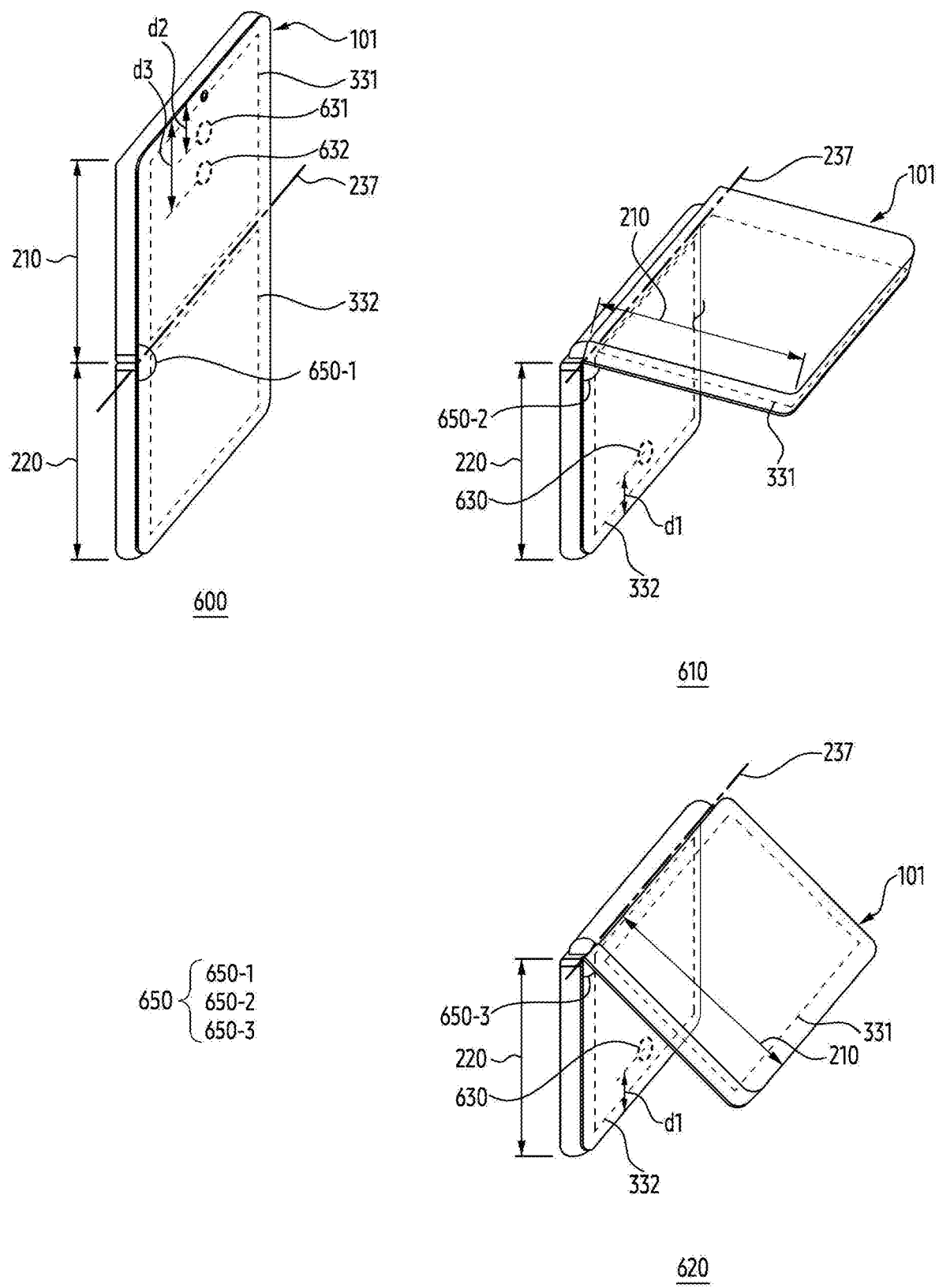
FIG. 6 includes perspective views illustrating an example of an operation in which an electronic device according to an embodiment adjusts a mapping location and a size of a screen based on an angle between a first housing and a second housing according to various embodiments.

FIG. 6 includes perspective views illustrating an example of an operation in which an electronic device adjusts a mapping location and a size of a screen based on an angle between a first housing and a second housing according to various embodiments. An electronic device 101 may be referred to the electronic device 101 of FIG. 1. States 600, 610, and 620 may include the electronic device 101. In the states 600, 610, and 620, the electronic device 101 may include the same folding axis 237. For example, the electronic device 101 may change a location of a first housing 210 and a second housing 220 based on the folding axis 237. The state 600 may include the electronic device 101 in an unfolding state. The states 610 and 620 may include the electronic device 101 in a sub folding state. The electronic device 101 may identify an angle 650 based on at least one sensor. An angle 650-1 may be 180 degrees. An angle 650-2 may be equal to or greater than 40 degrees and equal to or less than 60 degrees. An angle 650-3 may be equal to or greater than 20 degrees and less than 40 degrees. The angles 650-2 and 650-3 may be an example of an angle causing a screen displayed in a first portion 331 to be reflected on a second portion 332. For example, the angles 650-2 and 650-3 may be included in a specified range between 20 and 60 degrees.

According to an embodiment, the electronic device 101 may display a first screen (e.g., the screen 343 of FIG. 3) in the first portion 331 in the states 610 and 620. The first screen may be displayed based on execution of one of a plurality of applications stored in a memory (e.g., the memory 130 of FIG. 1) of the electronic device 101. In the state 600, the first screen may be displayed along a different direction from another second screen (e.g., the screen 340 of FIG. 3) displayed by the electronic device 101. For example, in case that the second screen is displayed along a first direction (e.g., the first direction 301 of FIG. 3), the electronic device 101 may display the first screen in a second direction (e.g., the second direction 302 of FIG. 3). For example, in case that the electronic device 101 displays the first screen on the first portion 331 along the second direction, a third screen reflected by the first screen may be displayed on the second portion 332 along the first direction.

According to an embodiment, the electronic device 101 may identify an input to the second portion 332 as an input to the first portion 331 based on the angle 650 between the first housing 210 and the second housing 220. For example, the electronic device 101 may deactivate at least one sensor included in the first portion 331, while receiving at least one input, using the second portion 332. For example, a point of the first portion 331 that the electronic device 101 maps to one point of the second portion 332 may be different according to the angle 650. For example, a length from a first point 630 to an edge (e.g., the second edge 330-2 of FIG. 3) of the second portion 332 may be 'd1'. For example, a length from a second point 631 to an edge (e.g., the first edge 330-1 of FIG. 3) of the first portion 331 may be 'd3'. For example, a length from a third point 632 to the edge of the first portion 331 may be 'd2'.

According to an embodiment, the electronic device 101, in the state 610, may receive a first input to the first point 630 while displaying at least one screen in the first portion 331. For example, the electronic device 101 may receive the first input based on a sensor (e.g., a TSP) included in a flexible display (e.g., the flexible display 150 of FIG. 1). For example, the electronic device 101 may identify the received first input as an input to the second point 631. The electronic device may execute a function based on a screen displayed in the first portion 331 based on an identified input. As an example, the electronic device 101 may initiate execution of an application corresponding to a screen.

According to an embodiment, the electronic device 101, in the state 620, may receive a second input to the first point 630, while displaying at least one screen in the first portion 331. For example, the electronic device 101 may identify the received second input as an input to the third point 632. The electronic device 101 may execute a function based on the screen displayed in the first portion 331 based on an identified input. As an example, the electronic device 101 may initiate execution of an application corresponding to the screen.

According to an embodiment, the electronic device 101 may adjust a size of a screen displayed in the first portion 331 based on the angle 650. For example, the electronic device 101 may identify the angle 650-2 based on at least one sensor (e.g., the sensor 160 of FIG. 1). The electronic device 101 may display a screen in the first portion 331 based on identifying the angle 650-2. The electronic device 101 may identify the angle 650-3, while displaying the screen in the first portion 331, using the at least one sensor. The electronic device 101 may adjust a size of the screen based on identifying the angle 650-3. As an example, the electronic device 101 may reduce the size of the screen.

As described above, the electronic device 101 according to an embodiment may display a screen based on execution of an application in the first portion 331 and display another screen causing reflection of the screen displayed in the first portion 331 in the second portion 332, based on identifying an angle within a specified range, such as the angles 650-2 and 650-3. The electronic device 101 may adjust a location and a size of the screen displayed in the first portion 331 based on the angles 650-2 and 650-3. For example, content included in a screen appearing on the first point 630, in the state 610 and the state 620, may be substantially similar. For example, the electronic device 101 may map an input to the first point 630 with an input to the second point 631 and/or the third point 632 based on identifying the angles 650-2 and 650-3. For example, the electronic device 101 may adjust the location, the size, and/or a mapping location of the screen displayed in the first portion 331 according to the angles 650-2 and 650-3.

Figure 7:
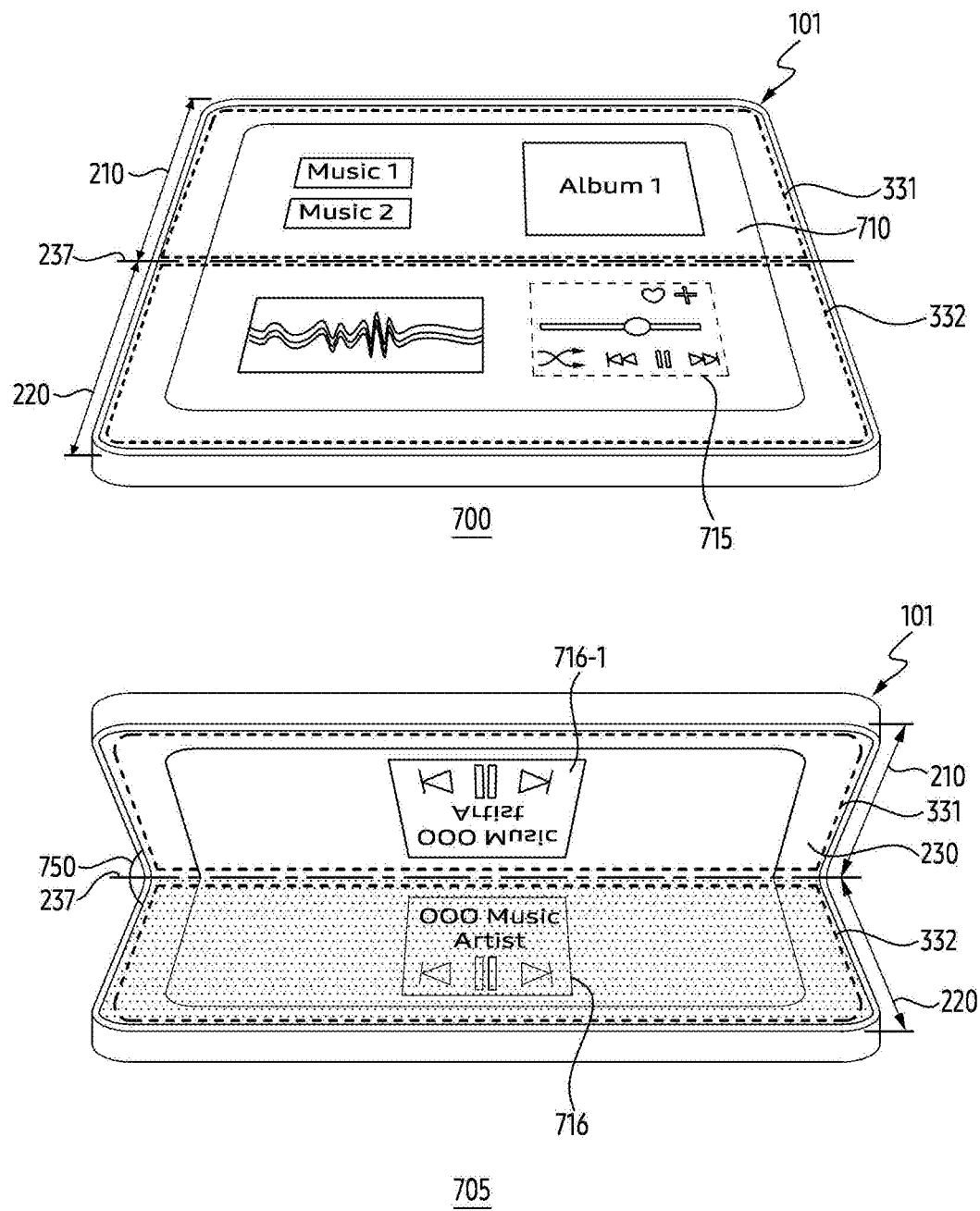
FIG. 7 includes perspective views illustrating an example of a screen displayed through a flexible display of an electronic device, using an application that plays audio, according to various embodiments.

FIG. 7 includes perspective views illustrating an example of a screen displayed through a flexible display of an electronic device, using an application that plays audio according to various embodiments. An electronic device 101 may be referred to the electronic device 101 of FIG. 1. A first housing 210 may be referred to the first housing 210 of FIG. 2A. A second housing 220 may be referred to the second housing 220 of FIG. 2A. A first portion 331 may be referred to the first portion 331 of FIG. 3. A second portion 332 may be referred to the second portion 332 of FIG. 3. A state 700 may include the electronic device 101 in an unfolding state (e.g., the state 200 of FIG. 2A). A state 705 may include the electronic device 101 in a sub folding state (e.g., the state 202 of FIG. 2B).

According to an embodiment, the electronic device 101 may display a screen 710 based on one of a plurality of applications stored in a memory (e.g., the memory 130 of FIG. 1), using all of the first portion 331 and the second portion 332. For example, the one application may be an example of an application for playing audio. As an example, the electronic device 101 may receive data on audio from an external server, using at least one communication circuit. The electronic device 101 may play audio based on the one application, using data on the audio. As an example, the electronic device 101 may play audio based on the one application, using data on audio different from the data stored in the memory.

According to an embodiment, the screen 710 displayed using all of the first portion 331 and the second portion 332 may include a plurality of contents 715. For example, the screen 710 may include a list of audios. For example, the electronic device 101 may receive an input indicating a selection of one audio from the list of audios. The electronic device 101 may play audio based on the received input. For example, the electronic device 101 may control data on audio, using the plurality of contents 715. For example, the plurality of contents 715 may include one of a visual object for temporarily pausing audio being played, information with respect to the audio (e.g., a song title, or a singer name), or a visual object for playing audio different from the audio.

According to an embodiment, the electronic device 101 may identify an angle 750 between the first housing 210 and the second housing 220, while displaying the screen 710, using a sensor (e.g., the sensor 160 of FIG. 1). The electronic device 101 may identify that the angle 750 is included in a specified range. As an example, the specified range may include a range between 20 degrees and 60 degrees. In the state 705, the electronic device 101 may display a screen 716-1 in the first portion 331. The screen 716-1 may be an example of a screen associated with the screen 710 and based on a different direction from the screen 710. As an example, the screen 716-1 may include a portion of a plurality of contents included in the screen 710. As an example, based on the screen 716-1 displayed on the first portion 331, an image 716 including the portion of the plurality of contents may appear on the second portion 332. As an example, the image 716 may be substantially similar to an image in which the screen 716-1 is inverted vertically based on a folding axis 237.

According to an embodiment, the electronic device 101, in the state 705, may receive at least one input, using the second portion 332. For example, the electronic device 101 may identify the at least one input as an input to the first portion 331 based on a location where the image 716 is displayed on the second portion 332. For example, the electronic device 101 may identify an input for a plurality of contents included in the image 716 on the second portion 332. Based on the input, the electronic device 101 may control audio played in the electronic device 101, using an application for playing the audio.

Figure 8:
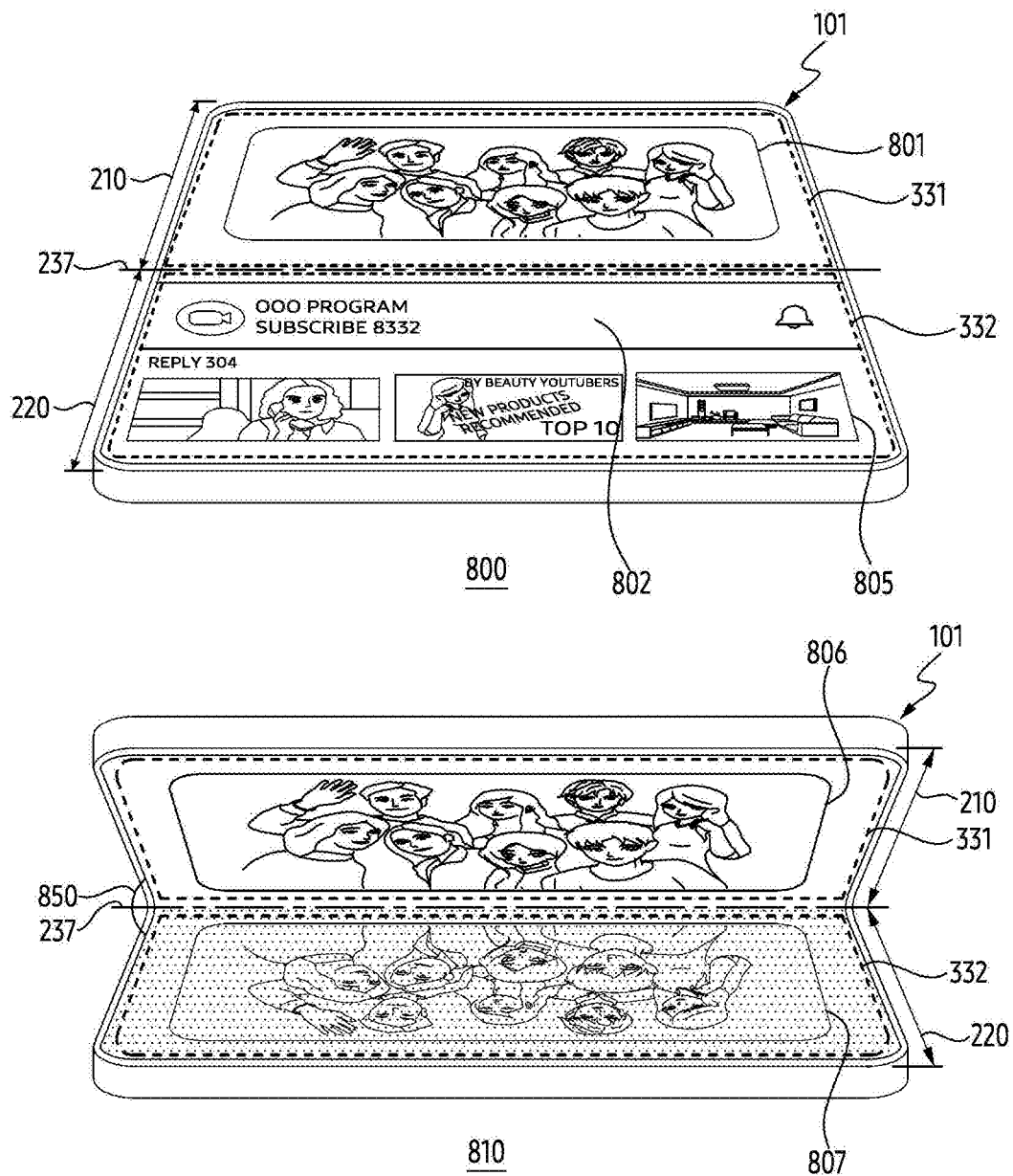
FIG. 8 includes perspective views illustrating an example of a video played through a flexible display of an electronic device, using an application that plays a video according to various embodiments.

FIG. 8 includes perspective views illustrating an example of a video played through a flexible display of an electronic device, using an application that plays a video according to various embodiments. An electronic device 101 may be referred to the electronic device 101 of FIG. 1. A first housing 210 may be referred to the first housing 210 of FIG. 2A. A second housing 220 may be referred to the second housing 220 of FIG. 2A. A first portion 331 may be referred to the first portion 331 of FIG. 3. A second portion 332 may be referred to the second portion 332 of FIG. 3. A state 800 may include the electronic device 101 in a folding state (e.g., the state 200 of FIG. 2A). A state 810 may include the electronic device 101 in a sub folding state (e.g., the state 202 of FIG. 2B).

According to an embodiment, the electronic device 101 may display a screen in a flexible display 230, using one of a plurality of applications stored in a memory (e.g., the memory 130 of FIG. 1). The screen may include a plurality of contents. A portion of the plurality of contents may include a video. The application may be an example of an application for playing a video. For example, the electronic device 101 may play a video 801 in the first portion 331 based on the one application. For example, based on the one application, the electronic device 101 may display a screen 802 including information different from the video 801 in the second portion 332, while playing the video 801. The different information may include a first list of videos different from the video. The electronic device 101 may receive an input indicating a selection of one video 805 from the first list. The electronic device 101 may play the video 805 in the first portion 331 based on the received input, by replacing the video 801. As an example, while playing the video 805, the electronic device 101 may display a screen including a second list different from the first list in the second portion 332. For example, the electronic device 101 may identify an angle 850 of the first housing 210 and the second housing 220, using a sensor (e.g., the sensor 160 of FIG. 1). As an example, the angle 850 may be equal to or greater than 20 degrees and equal to or less than 60 degrees. For example, the electronic device 101 may display a video 806 associated with the video 801 in the first portion 331 based on identifying the angle 850. The video 806 may be a video in which one of a direction, a location, or a size of the video 801 is changed.

According to an embodiment, the electronic device 101, in the state 810, may display the video 806 in the first portion 331. For example, a lower end of the video 806 may be a folding axis 237. For example, the electronic device 101 may display a black screen on the second portion 332. For example, an image 807 may be generated on the second portion 332 based on the video 806, using the black screen. As an example, an upper end of the image 807 may be the folding axis 237. For example, the image 807 may be a screen in which one of a direction, a location, or a size of the video 806 is changed.

As described above, a user of the electronic device 101, in the state 810, may identify the image 807. For example, the user of the electronic device 101, in the state 810, may block at least one light emitted toward the electronic device 101, using the first housing 210. Based on blocking the light, the user of the electronic device 101 may identify a screen displayed in a portion of the flexible display through a portion different from the portion.

Figure 9:
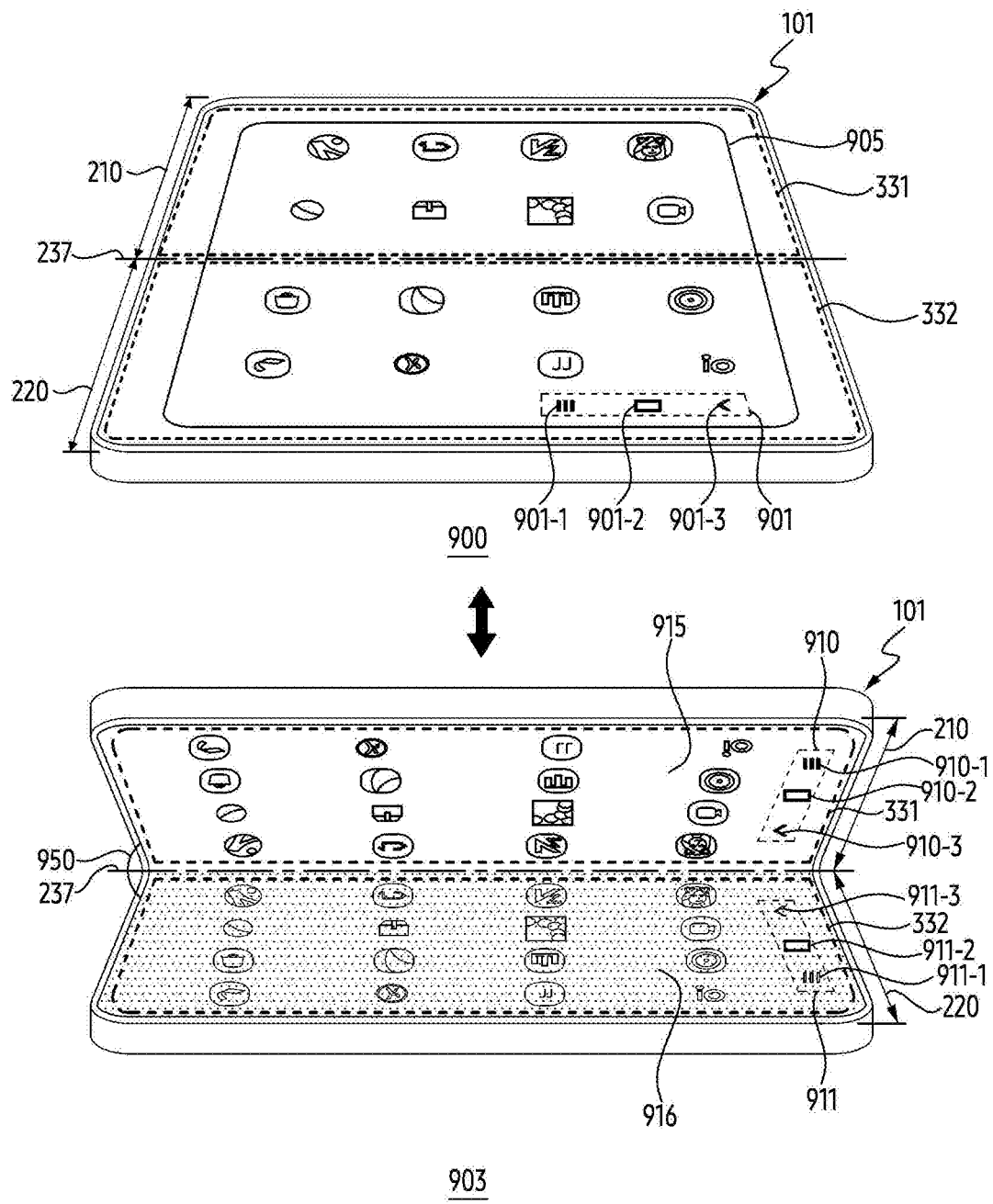
FIG. 9 includes perspective views illustrating an example of a home screen displayed through a flexible display of an electronic device, using a launcher application according to various embodiments.

FIG. 9 includes perspective views illustrating an example of a home screen displayed through a flexible display of an electronic device, using a launcher application according to various embodiments. An electronic device 101 may be referred to the electronic device 101 of FIG. 1. A first housing 210 may be referred to the first housing 210 of FIG. 2A. A second housing 220 may be referred to the second housing 220 of FIG. 2A. A first portion 331 may be referred to the first portion 331 of FIG. 3. A second portion 332 may be referred to the second portion 332 of FIG. 3. A state 900 may include the electronic device 101 in a folding state (e.g., the state 200 of FIG. 2A). A state 903 may include the electronic device 101 in a sub folding state (e.g., the state 202 of FIG. 2B).

In the state 900 according to an embodiment, the electronic device 101 may display a screen 905 in the first portion 331 and the second portion 332 based on at least one application. The one application may be an example of a launcher application. For example, the launcher application may be an application capable of executing at least one application, in a state of being executed by a processor (e.g., the processor 120 of FIG. 1) of the electronic device 101. For example, an execution screen of the launcher application may be referred to as a launcher screen, the home screen, or a menu screen. The launcher application may display the home screen displaying various icons corresponding to applications. Each icon may include an icon image. The electronic device 101 may launch applications different from the launcher application through the launcher application. The launcher application may include a set of instructions executed by the electronic device 101.

According to an embodiment, the electronic device 101 may display a navigation bar 901 in a displaying screen (e.g., the home screen) based on one application. For example, the electronic device 101 may control at least one of a plurality of applications stored in the memory, using the navigation bar 901. The electronic device 101 may change a state of a screen based on the one application, using the navigation bar 901. The navigation bar 901 may include at least one of a menu button 901-1, a home button 901-2, and/or a back button 901-3. For example, the electronic device 101 may provide a connection menu capable of being displayed on a display, using the menu button 901-1. The connection menu may include adding widget, changing wallpaper, search, edit, and/or an environment setting menu.

In case that a plurality of applications are executed, the electronic device 101 according to an embodiment may display a tray of the plurality of applications being executed, in response to an input of selecting the menu button 901-1. The tray of the applications may be arranged in an order in which the applications are executed. For example, the electronic device 101 may receive an input for selecting the home button 901-2 while displaying any screen different from the screen 905. The electronic device 101 may display the home screen in response to the input. For example, the electronic device 101 may display a previously stacked screen of a screen displayed on the flexible display (e.g., the flexible display 150 of FIG. 1), using the back button 250-3.

According to an embodiment, the electronic device 101 may receive an input of clicking (or touching) at least one icon in the screen 905. For example, the electronic device 101 may execute an application in response to an input of touching (or clicking) an icon matching the application. For example, the electronic device 101 may display an icon corresponding to an application that plays a video in the screen 905. The electronic device 101 may execute the application that plays the video based on receiving an input for touching the icon. As an example, based on the application, the electronic device 101 may play a video (e.g., the video 801 of FIG. 8). For example, the electronic device 101 may display an icon corresponding to an application that plays audio in the screen 905. The electronic device 101 may execute the application that plays the audio, by receiving the input of touching the icon. Based on the application that plays the audio, the electronic device 101 may display a screen (e.g., the screen 710 of FIG. 7).

According to an embodiment, the electronic device 101 may identify an angle 950 between the first housing 210 and the second housing 220, using a sensor (e.g., the sensor 160 of FIG. 1). The angle 950 may be equal to or greater than 20 degrees and equal to or less than 60 degrees. For example, the electronic device 101, in the state 903, may display a screen 915 in the first portion 331. The screen 915 may be an example of a screen associated with the screen 905 and displayed based on a different direction. For example, the screen 915 may include icons corresponding to a plurality of applications. For example, the screen 915 may be referred to the home screen based on the launcher application. As an example, the screen 915 may be a screen in which a size and/or a direction of the screen 905 is changed.

According to an embodiment, the electronic device 101 may display a black screen (e.g., the screen 347 of FIG. 3) in the second portion 332 while displaying the screen 915 in the first portion 331. An image 916 may be an example of a screen generated on the second portion 332 by the screen 915 based on the black screen. The image 916 may include an icon of applications and/or an image corresponding to a navigation bar 910. As an example, an upper end of the image 916 may be a folding axis 237.

According to an embodiment, the electronic device 101 may receive an input, while displaying the screen 915, using the second portion 332. The electronic device 101 may identify a point of the received input on the second portion 332. The electronic device 101 may identify a point of the first portion 331 mapped to the point of the input. The electronic device 101 may identify an icon of an application included in the screen 915 located at the point of the first portion 331. The electronic device 101 may initiate execution of an application corresponding to the identified icon.

According to an embodiment, the electronic device 101 may include the navigation bar 910 in the screen 915. The navigation bar 910 may include a menu button 910-1, a home button 910-2, and/or a back button 910-3. The electronic device 101 may receive an input, using the second portion 332. For example, the electronic device 101 may receive a first input to a first point 911-1 of bar 911. The electronic device 101 may map the first point 911-1 to a location of the menu button 910-1 in the first portion 331. The electronic device 101 may initiate execution of a function of the menu button 910-1 based on the first input. For example, the electronic device 101 may receive a second input to a second point 911-2. The electronic device 101 may map the second point 911-2 to a location of the home button 910-2 in the first portion 331. The electronic device 101 may initiate execution of a function of the home button 910-2 based on the second input. For example, the electronic device 101 may receive a third input to a third point 911-3. The electronic device 101 may map the third point 911-3 to a location of the back button 910-3 in the first portion 331. The electronic device 101 may execute a function of the back button 910-3 based on the third input. For example, the electronic device 101 may display a pop-up message based on at least one application, while displaying at least one screen, in the first portion 331. An operation of the electronic device 101 displaying the pop-up message based on the application will be described in greater detail below with reference to FIG. 10.

Figure 10:
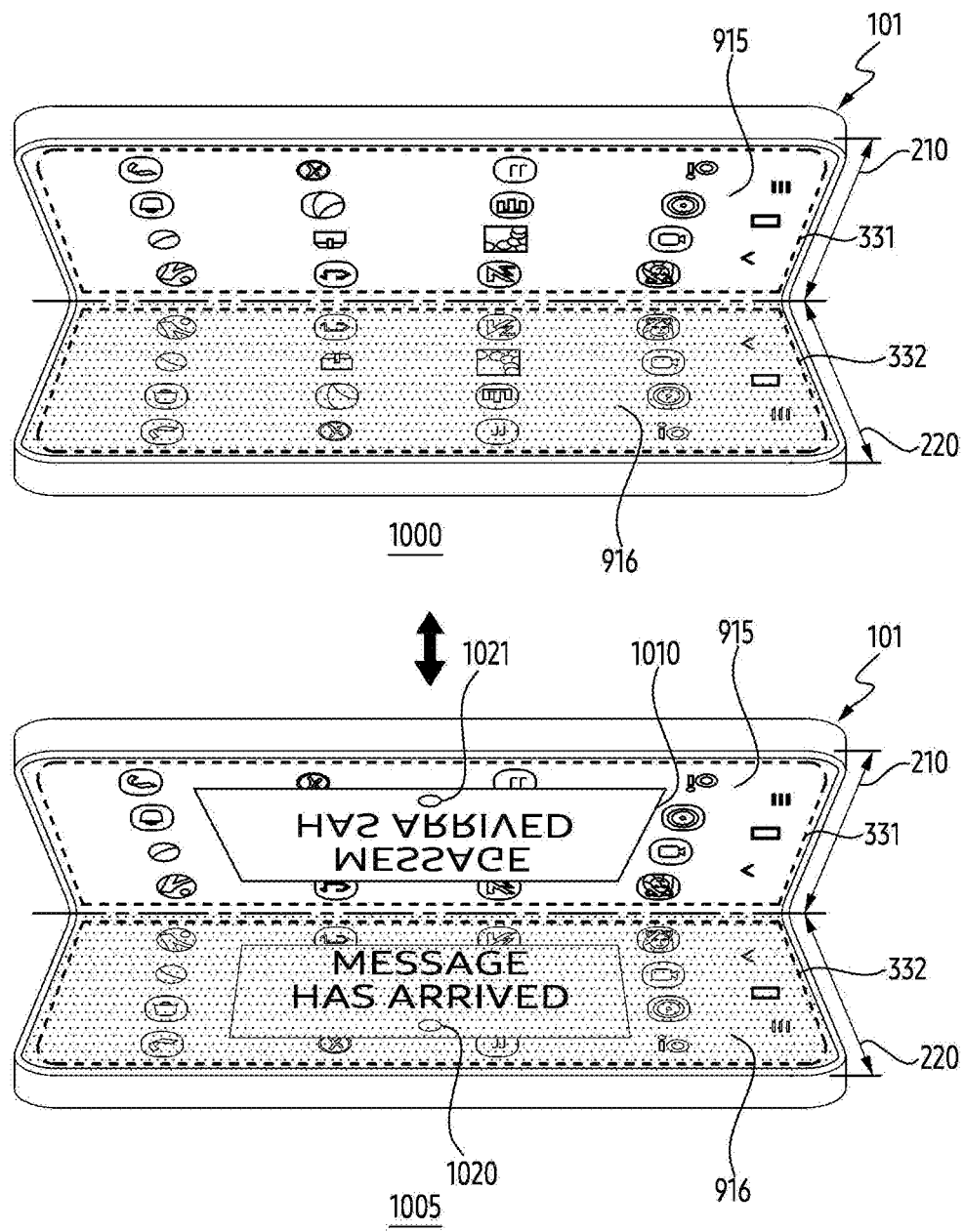
FIG. 10 includes perspective views illustrating an example of a pop-up message displayed based on an application stored in a memory of an electronic device according to various embodiments.

FIG. 10 includes perspective views illustrating an example of a pop-up message displayed based on an application stored in a memory of an electronic device according to various embodiments. An electronic device 101 may be referred to the electronic device 101 of FIG. 1. A first housing 210 may be referred to the first housing 210 of FIG. 2A. A second housing 220 may be referred to the second housing 220 of FIG. 2A. A first portion 331 may be referred to the first portion 331 of FIG. 3. A second portion 332 may be referred to the second portion 332 of FIG. 3. A state 1000 may be referred to the state 903 of FIG. 9. A state 1005 may include the electronic device 101 in a sub folding state (e.g., the state 202 of FIG. 2B).

According to an embodiment, the electronic device 101, in the state 1000, may receive a pop-up message (e.g., a pop-up message 1010) based on at least one application, while displaying a screen 915 in the first portion 331. For example, the pop-up message may be an example of a push notification. The push notification, independently of execution of a specific application by the electronic device 101, may be displayed based on a signal transmitted from a server to the electronic device 101 for providing a service based on the specific application. For example, a pop-up message may be displayed by the electronic device 101 to notify receipt of an SMS message or a text message.

According to an embodiment, the electronic device 101, in the state 1005, may display a pop-up message 1010 in the first portion 331. For example, the electronic device 101 may display the pop-up message 1010 in the first portion 331, by overlapping on the screen 915. For example, the electronic device 101 may display the pop-up message 1010 having a specified alpha value (e.g., an alpha value indicating opacity) by overlapping on the screen 915. For example, an upper end of the pop-up message 1010 may be a folding axis 237. For example, the pop-up message 1010 may be inverted vertically based on a folding axis (e.g., the folding axis 237 of FIG. 2A). The vertically inverted pop-up message may be generated on the second portion 332.

According to an embodiment, the electronic device 101 may receive at least one input through the second portion 332 while displaying a screen in the first portion 331. For example, the electronic device 101 may receive an input to a first point 1020. For example, the first point 1020 may be a point where a pop-up message to which the pop-up message 1010 is vertically inverted based on a folding axis (e.g., the folding axis 237 of FIG. 2A) is located. For example, the electronic device 101 may identify an input to the first point 1020 as an input to a second point 1021 in the first portion 331. For example, the electronic device 101 may identify the input to the first point 1020 as an input of touching (or tapping) the pop-up message 1010 located at the second point 1021. For example, the electronic device 101 may initiate execution of an application corresponding to the pop-up message 1010 based on the input. For example, based on the execution of the application, the electronic device 101 may display at least one screen (or activity) in the first portion 331. The electronic device 101 may display the at least one screen in the first portion 331 based on an upper end of the at least one screen as a folding axis (e.g., the folding axis 237 of FIG. 2A). The at least one screen may be inverted vertically based on the folding axis. The at least one vertically inverted screen may be generated on the second portion 332. For example, the electronic device 101 may display a plurality of pop-up messages. Applications corresponding to each of the plurality of pop-up messages may be different. However, the disclosure is not limited to the above-described embodiment.

As described above, a user of the electronic device 101, in the state 1005, may confirm the pop-up message 1010 through the second portion 332. The user of the electronic device 101 may touch or tap the pop-up message confirmed through the second portion 332. The electronic device 101 may initiate execution of an application corresponding to the pop-up message based on the touch or tap.

Figure 11:
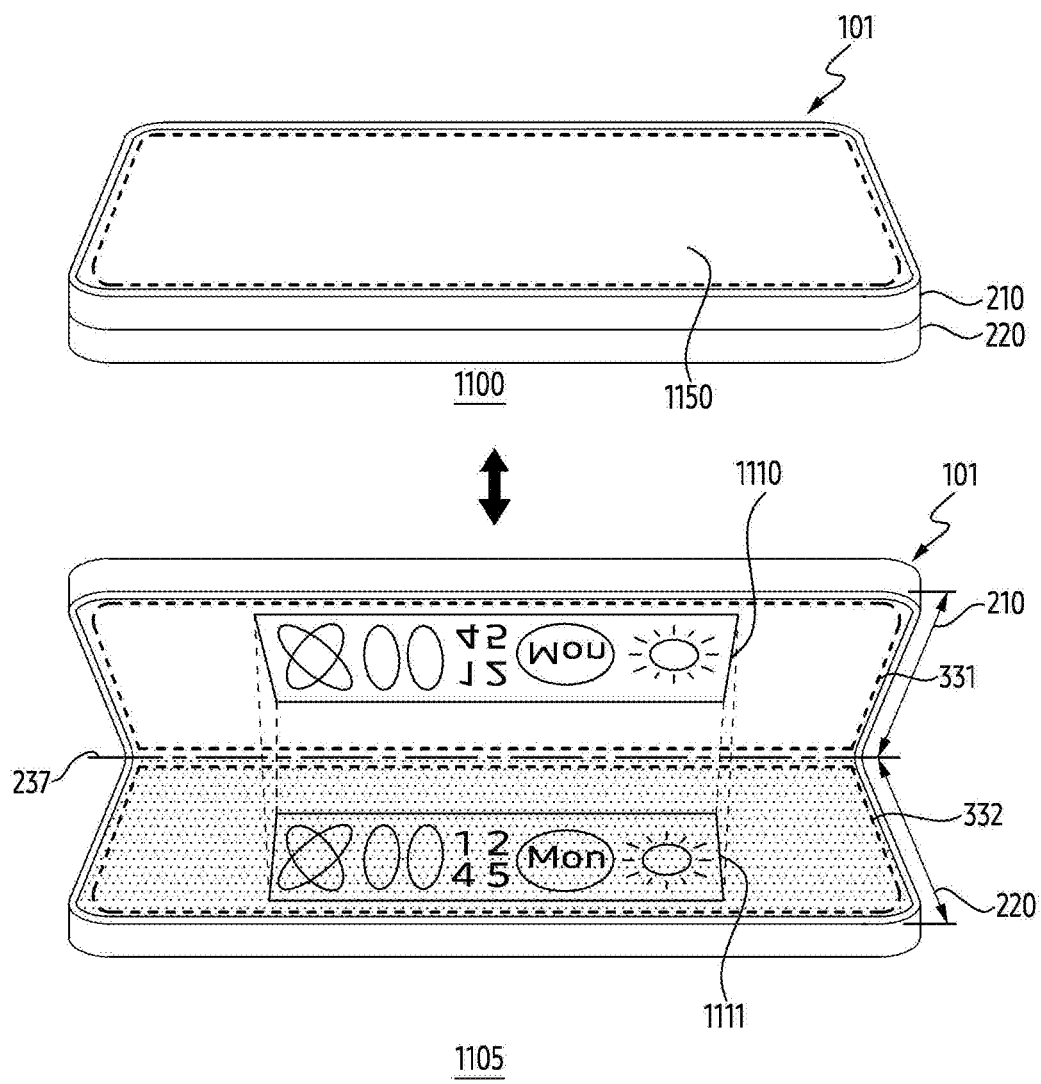
FIG. 11 includes perspective views illustrating an example of a lock screen displayed by an electronic device through a flexible display within a specified range, according to various embodiments.

FIG. 11 includes perspective views illustrating an example of a lock screen displayed through a flexible display by an electronic device within a specified range, according to various embodiments. An electronic device 101 may be referred to the electronic device 101 of FIG. 1. A first housing 210 may be referred to the first housing 210 of FIG. 2A. A second housing 220 may be referred to the second housing 220 of FIG. 2A. A first portion 331 may be referred to the first portion 331 of FIG. 3. A second portion 332 may be referred to the second portion 332 of FIG. 3. A state 1100 may include the electronic device 101 in a fully folding state (e.g., the state 203 of FIG. 2B). A state 1005 may include the electronic device 101 in a sub folding state (e.g., the state 202 of FIG. 2B).

According to an embodiment, the electronic device 101 may include a display 1150 different from at least one of a flexible display (e.g., the flexible display 150 of FIG. 1) among the first housing 210 or the second housing 220, in the state 1100. For example, the flexible display 150 may be disposed on a surface different from a surface on which the flexible display is disposed among at least one of the first housing 210 or the second housing 220.

According to an embodiment, the display 1150 of the electronic device 101 may output visualized information to a user. For example, the display 1150 may output visualized information to the user, by being controlled by a controller such as a processor (e.g., the processor 120 of FIG. 1). For example, the display 1150 may include a FPD and/or electronic paper. The FPD may include an LCD, a PDP, and/or one or more LEDs. The LED may include an OLED.

According to an embodiment, the electronic device 101 may identify that an angle between the first housing 210 and the second housing 220 increases to be equal to or greater than a specified angle based on the sensor (e.g., the sensor 160 of FIG. 1). For example, the specified angle may represent an angle that causes a screen displayed in the first portion 331 of the electronic device 101 to be reflected by the second portion 332. As an example, the specified angle may include one of an angle equal to or greater than 20 degrees and equal to or less than 60 degrees. As an example, the specified angle may be 20 degrees. For example, the electronic device 101 may display the screen in the first portion 331 based on identifying that the angle is increased to be equal to or greater than the specified angle.

According to an embodiment, the electronic device 101, in a state 1105, may display a screen 1110 based on at least one application. An upper end of the screen 1110 may be a folding axis 237. The screen 1110 may be an example of a lock screen. For example, the screen 1110 may include a screen requesting user information (e.g., a password). For example, the screen 1110 may include at least one of weather, a date, or time. For example, the screen 1110 may include a visual object corresponding to at least one of weather, a date, or time. The electronic device 101 may cause reflection of the screen 1110 displayed in the first portion 331 based on an angle between the first housing 210 and the second housing 220. The reflected screen may be an image 1111 on the second portion 332.

According to an embodiment, the electronic device 101 may receive at least one input through the second portion 332 while displaying the screen 1110 in the first portion 331. For example, the at least one input may be a swipe input. For example, the electronic device 101 may display a screen (e.g., the screen 915 of FIG. 9) based on a launcher application in the first portion 331 based on receiving the swipe input through the second portion 332.

As described above, the electronic device 101 according to an embodiment may identify the angle between the first housing 210 and the second housing 220 based on the sensor (e.g., the sensor 160 of FIG. 1). For example, the electronic device 101, in the fully folding state, may display a lock screen in the first portion 331 based on identifying an angle included in a specified range associated with an acute angle. The electronic device 101 may provide a user experience based on a characteristic in which the lock screen in the first portion 331 is reflected on the second portion 332 based on the angle. The electronic device 101 may provide various user experiences based on a range of an angle between 0 degrees and 180 degrees.

Figure 12:
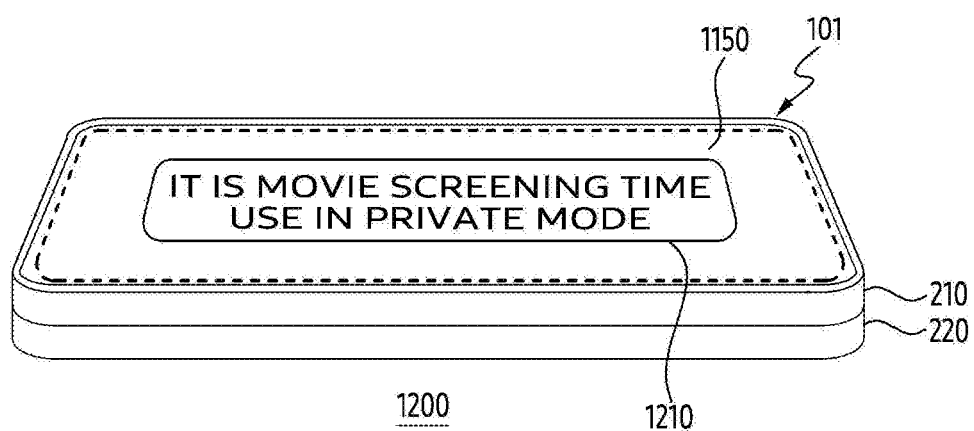
FIG. 12 is a perspective view illustrating an example screen requesting to adjust an angle between a first housing and a second housing within a specified range based on an application stored in an electronic device according to various embodiments.

FIG. 12 is a perspective view illustrating a screen requesting to adjust an angle between a first housing and a second housing within a specified range based on an application stored in an electronic device according to various embodiments. An electronic device 101 may be referred to the electronic device 101 of FIG. 1. A first housing 210 may be referred to the first housing 210 of FIG. 2A. A second housing 220 may be referred to the second housing 220 of FIG. 2A. A display 1150 may be referred to the display 1150 of FIG. 11.

According to an embodiment, in a state 1200 the electronic device 101 may display a screen 1210 in the display 1150 based on one application among a plurality of applications stored in a memory (e.g., the memory 130 of FIG. 1). The screen 1210 may include information requesting to adjust the angle between the first housing 210 and the second housing 220 within a specified range. For example, the specified range may be equal to or greater than 20 degrees and equal to or less than 60 degrees. For example, the one application may be an application distributed by at least one service provider providing a service associated with an electronic ticket. For example, the one application may be an application for payment of the electronic ticket. For example, the one application may be an application for inquiring the electronic ticket. For example, the one application may be an application for displaying an image corresponding to the electronic ticket on a display (e.g., the flexible display 150 of FIG. 1 or the display 1150). However, the disclosure is not limited thereto.

According to an embodiment, the electronic device 101 may obtain information of the electronic ticket based on one application among the plurality of applications stored in the memory. The information of the electronic ticket may include a date and time. For example, the electronic device 101 may identify contact between a user and the electronic device 101, using at least one sensor (e.g., a grip sensor). For example, the electronic device 101 may display the screen 1210 in the display 1150 based on identifying the contact, using the information. For example, the screen 1210 may include information requesting to adjust the angle between the first housing 210 and the second housing 220 within a specified range (e.g., equal to or greater than 20 degrees and equal to or less than 60 degrees). For example, in case of identifying an angle within the specified range, the electronic device 101 may display a lock screen (e.g., the screen 1110 of FIG. 11) in a first portion (e.g., the first portion 331 of FIG. 3). The state in which the electronic device 101 displays the lock screen may be referred to the state 1105 of FIG. 11. For example, the electronic device 101, in the state, may receive an input through a second portion (e.g., the second portion 332 of FIG. 3). Based on the received input, the electronic device 101 may display a home screen (e.g., the screen 915 of FIG. 9) using a launcher application, by replacing the lock screen.

As described above, the electronic device 101 may request a user of the electronic device 101 to adjust the angle between the first housing 210 and the second housing 220 based on at least one application. In response to adjusting the angle, the electronic device 101 may display a screen in the first portion (e.g., the first portion 331 of FIG. 3) based on a limited viewing angle. The electronic device may cause reflection on the second portion (e.g., the second portion 332 of FIG. 3), using the screen based on the adjusted angle. The electronic device may adjust light emitted through a flexible display, using a characteristic using the reflection.

Figure 13:
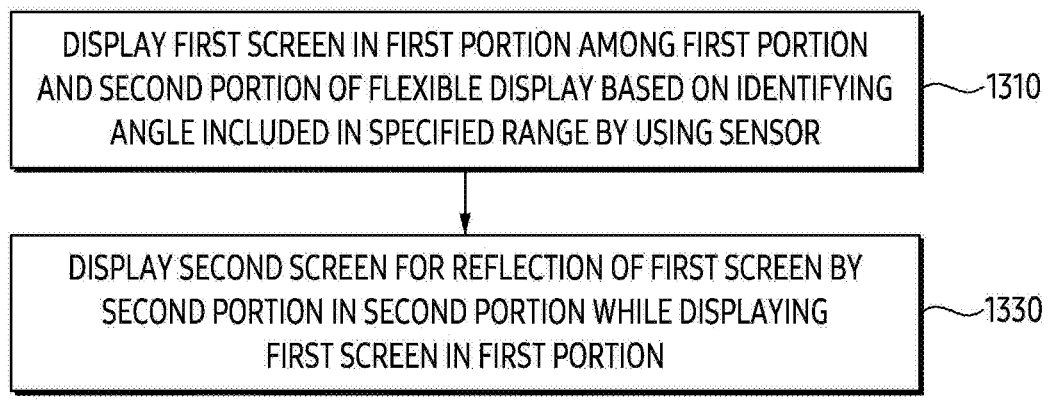
FIG. 13 is a flowchart illustrating an example operation in which an electronic device displays a screen through a flexible display within a specified range according to various embodiments.

FIG. 13 is a flowchart illustrating an example operation in which an electronic device displays a screen through a flexible display within a specified range according to various embodiments. Referring to FIG. 13, at least one of operations may be performed by the electronic device 101 of FIG. 1 and/or the processor 120 of FIG. 1.

Referring to FIG. 13, in an operation 1310, a processor according to an embodiment may display a first screen in a first portion among the first portion and a second portion of a flexible display, based on identifying an angle included in a specified range, using a sensor. For example, the sensor may be referred to the sensor 160 of FIG. 1. The angle may represent an angle between a first housing (e.g., the first housing 210 of FIG. 2A) and a second housing (e.g., the second housing 220 of FIG. 2A) of the electronic device. The angle may be adjusted to be equal to or greater than 0 degrees and equal to or less than 180 degrees. The specified range may represent an angle range equal to or greater than 20 degrees and equal to or less than 60 degrees. For example, the electronic device may identify a housing in contact with the ground, based on the sensor. A folding axis may be referred to the folding axis 237 of FIG. 2A. The flexible display may be referred to the flexible display 150 of FIG. 1. The first portion may be a portion of the flexible display divided by the folding axis (e.g., the folding axis 237 of FIG. 2A). The first portion may be disposed on a surface of the first housing. The first portion may be referred to the first portion 331 of FIG. 3. The second portion may be a portion different from the portion. The second portion may be disposed on a surface of the second housing. The second portion may be referred to the second portion 332 of FIG. 3. The first screen may be referred to the screen 343 of FIG. 3.

Referring to FIG. 13, in an operation 1330, the processor according to an embodiment may display a second screen for reflection of the first screen by the second portion in the second portion while displaying the first screen in the first portion. For example, the second screen (e.g., the screen 347 of FIG. 3) may be a black screen or an opaque screen. For example, the angle between the first housing and the second housing may include an angle that causes the first screen to be reflected by the second portion. As an example, the second screen may be a virtual image generated on the second portion by the first screen.

As described above, the electronic device according to an embodiment may display a screen in a portion of a flexible display based on identifying an angle included in a specified range associated with an acute angle. Based on the angle, an image reflected by the screen may appear on a different portion of the flexible display. The electronic device may provide various user experiences according to the angle, using the image. The electronic device may prevent and/or reduce leakage of user information, using the image displayed within a relatively narrow viewing angle.

Figure 14:
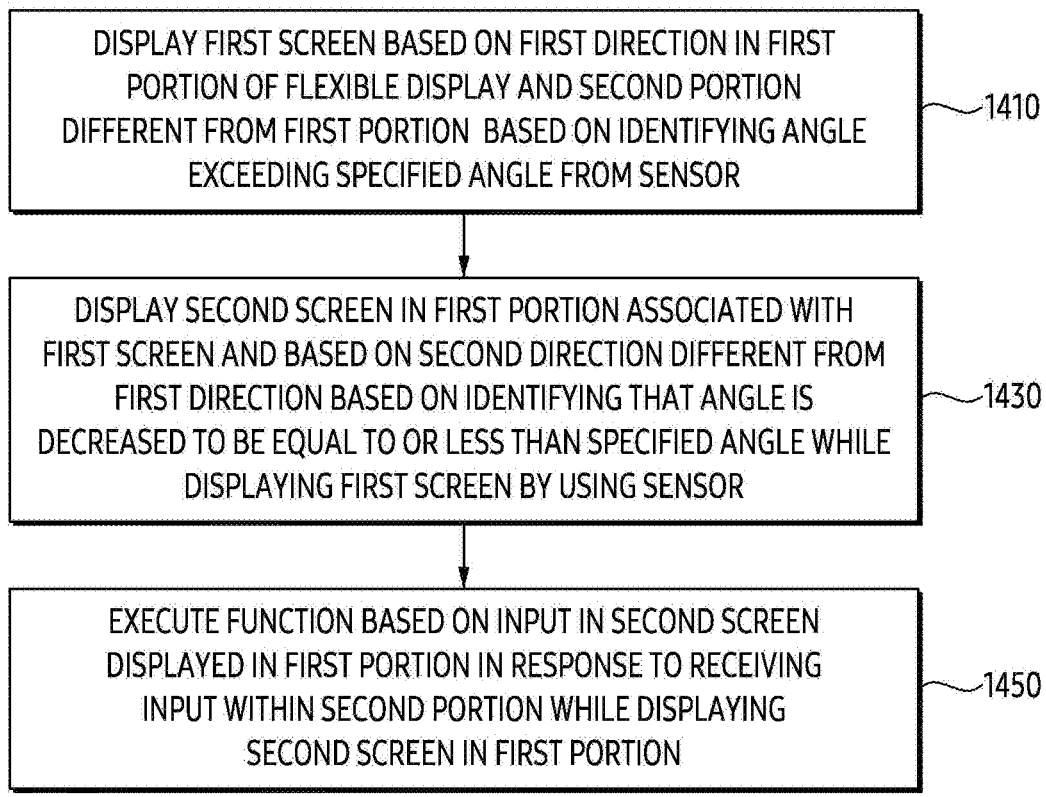
FIG. 14 is a flowchart illustrating an example operation in which an electronic device displays a screen based on identifying an angle less than a specified angle according to various embodiments.

FIG. 14 is a flowchart illustrating an example operation in which an electronic device displays a screen based on identifying an angle less than a specified angle according to various embodiments. Referring to FIG. 14, at least one of the operations may be performed by the electronic device 101 of FIG. 1 and/or the processor 120 of FIG. 1.

Referring to FIG. 14, in an operation 1410, a processor according to an embodiment may display a first screen based on a first direction, in a first portion of a flexible display and a second portion different from the first portion, based on identifying an angle exceeding a specified angle from a sensor. For example, the sensor may be referred to the sensor 160 of FIG. 1. The flexible display may be referred to the flexible display 150 of FIG. 1. The first portion may be referred to the first portion 331 of FIG. 3. The second portion may be referred to the second portion 332 of FIG. 3. The first direction may be referred to the first direction 301 of FIG. 3. For example, the first direction may be an example of a direction from an edge (e.g., the second edge 330-2 of FIG. 3) toward a folding axis (e.g., the folding axis 237 of FIG. 2A). The first screen may be referred to the screen 340 of FIG. 3. The angle may represent an angle between a first housing (e.g., the first housing 210 of FIG. 2A) and a second housing (e.g., the second housing 220 of FIG. 2A). The specified angle may represent 60 degrees. For example, in case of identifying an angle exceeding 60 degrees using the sensor, the processor may display the first screen based on the first direction, using all of the first portion and the second portion. For example, an upper end of the first screen may be an edge (e.g., the first edge 330-1 of FIG. 3 or the second edge 330-2 of FIG. 3) of the flexible display. For example, the first screen may include a plurality of contents. As an example, the first screen may be a screen based on one of a plurality of applications stored in a memory (e.g., the memory 130 of FIG. 1) of the electronic device. As an example, the first screen may include a video. As an example, the first screen may include icons of the plurality of applications. As an example, the first screen may include visual objects for controlling audio. As an example, the first screen may include a visual object for controlling at least one of the plurality of applications.

Referring to FIG. 14, in an operation 1430, the processor according to an embodiment, may display a second screen, which is associated with the first screen and based on a second direction different from the first direction, in the first portion, based on identifying that an angle is decreased to be equal to or less than the specified angle, while displaying the first screen, using the sensor. For example, the second direction may be referred to the second direction 302 of FIG. 3. The second screen may be referred to the screen 343 of FIG. 3. An upper end of the second screen may be a folding axis (the folding axis 237 of FIG. 2A). As an example, the second screen may include a video. As an example, the second screen may include icons of the plurality of applications stored in the memory. For example, the second screen may include visual objects for controlling audio.

Referring to FIG. 14, in an operation 1450, the processor according to an embodiment may execute a function based on an input in the second screen displayed in the first portion, in response to receiving the input within the second portion, while displaying the second screen in the first portion. For example, the processor may receive an input based on a sensor (e.g., a TSP) included in the flexible display. The input may be referred to an input for the point 555 of FIG. 5A. The processor may identify an input to the second portion as an input to the first portion. The processor may map a point of the second portion to a point of the first portion. The processor may deactivate a portion of a sensor (e.g., a TSP) included in the first portion. As an example, the input may be a swipe input. The processor may identify a swipe input based on the first direction (e.g., the first direction 301 of FIG. 5B) in the second portion as a swipe input based on the second direction (e.g., the second direction 302 of FIG. 5B) in the first portion. For example, the processor may receive a specified gesture in the second portion. As an example, the processor may perform one of capturing a screen, displaying a home screen, moving to a previous screen, or changing an executing application, based on identifying the specified gesture.

As described above, the electronic device according to an embodiment may display the first screen based on the first direction in the first portion and the second portion of the flexible display based on identifying an angle exceeding a specified angle in a folding state using a sensor. The electronic device may display the second screen associated with the first screen and based on the second direction in the first portion based on identifying an angle equal to or less than the specified angle. While the electronic device displays the second screen within the first portion, a third screen, which is inverted vertically with respect to the folding axis and related to the second screen, may appear on the second portion. The electronic device may receive an input, using the second portion. The electronic device may identify the input as an input to the first portion. The electronic device may control the second screen based on the input to the first portion. A user of the electronic device may identify the second screen through the third screen appearing on the second portion. The user of the electronic device may control the second screen, using an input to the third screen.

Figure 15:
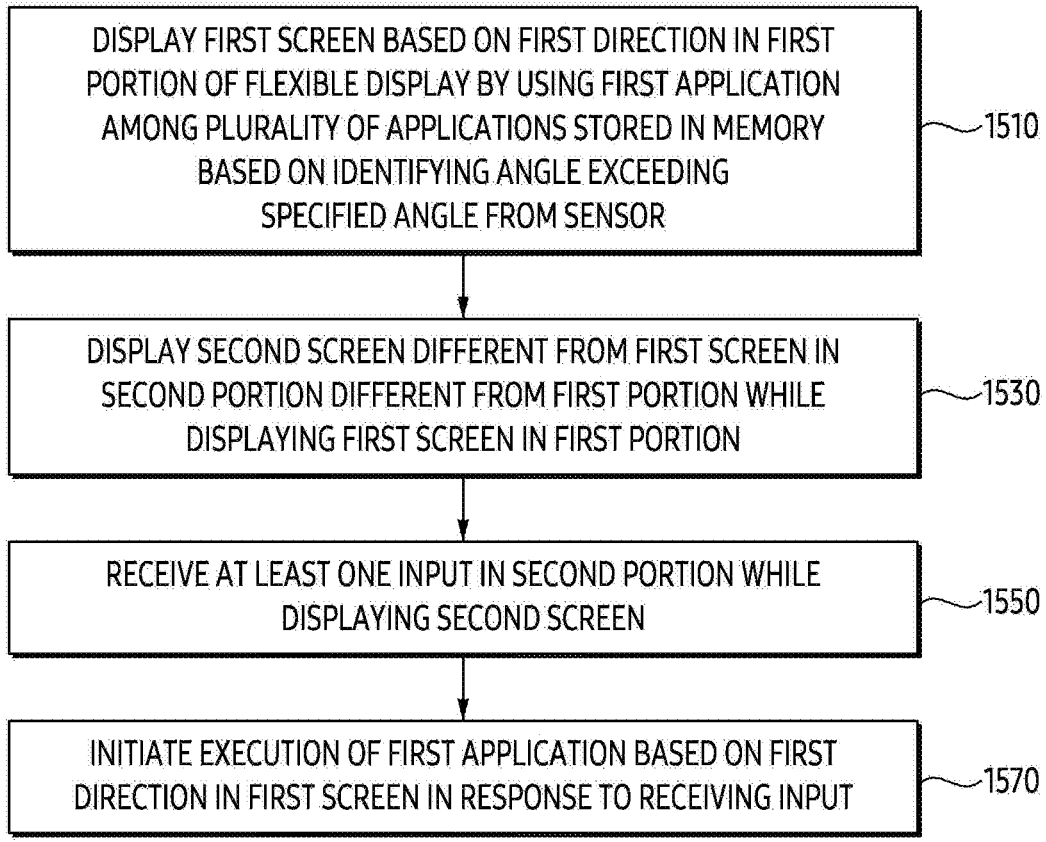
FIG. 15 is a flowchart illustrating an example operation in which an electronic device displays a screen based on identifying an angle exceeding a specified angle according to various embodiments.

FIG. 15 is a flowchart illustrating an example operation in which an electronic device displays a screen based on identifying an angle exceeding a specified angle according to various embodiments. Referring to FIG. 15, at least one of operations may be performed by the electronic device 101 of FIG. 1 and/or the processor 120 of FIG. 1.

Referring to FIG. 15, in an operation 1510, a processor according to an embodiment may identify an angle exceeding a specified angle from the sensor, and display a first screen based on a first direction in a first portion of a flexible display using a first application among a plurality of applications stored in a memory based on identifying the angle. The flexible display may be referred to the flexible display 150 of FIG. 1. The first portion may be referred to the first portion 331 of FIG. 3. A second portion may be referred to the second portion 332 of FIG. 3. The first direction may be referred to the second direction 302 of FIG. 3. For example, the sensor may be referred to the sensor 160 of FIG. 1. The angle may represent an angle between a first housing (e.g., the first housing 210 of FIG. 2A) and a second housing (e.g., the second housing 220 of FIG. 2A). The specified angle may be 20 degrees. For example, the first application may be an application for playing a video and/or audio. For example, the first application may be an application (e.g., a launcher application) for executing a plurality of applications. For example, the first application may be an application including a push notification. For example, the first screen may be referred to the screen 343 of FIG. 3. The first screen may include a plurality of contents. As an example, the first screen may include a video. As an example, the first screen may include visual objects for controlling audio played in the electronic device. As an example, the first screen may include icons of the plurality of applications stored in the memory. As an example, the first screen may be a lock screen.

Referring to FIG. 15, in an operation 1530, the processor according to an embodiment may display a second screen different from the first screen in a second portion different from the first portion while displaying the first screen in the first portion. For example, the second screen may be a pop-up message (e.g., the pop-up message 1001-1 of FIG. 10). For example, the second screen may be displayed based on one application among the plurality of applications stored in the memory. The one application may be an example of an application for payment of an electronic ticket. The one application may be an example of an application for chatting. The one application may be an example of an application for using electronic banking. As an example, the second screen may be an example of a push notification. As an example, the second screen may be an example of a text message. As an example, the second screen may be an alarm set by a user of the electronic device to be displayed at a specified time. For example, the processor may display a pop-up message based on a chat application, by overlapping the pop-up message on a home screen, while displaying the home screen based on a launcher application.

Referring to FIG. 15, in an operation 1550, the processor according to an embodiment may receive at least one input in the second portion while displaying the second screen. For example, the processor may deactivate at least one sensor included in the first portion while receiving the at least one input, using the second portion. The sensor may be an example (e.g., a TSP) of a sensor used by the electronic device to receive an input. For example, the processor may map an input to the second portion with an input to the first portion according to the angle between the first housing and the second housing. For example, the processor may map an input to a first point of a sensor included in the second portion as an input to a second point of a sensor included in the first portion. For example, the processor may adjust a location of a point with respect to the first portion mapped to the input to the first point based on the angle. Based on the mapping, the processor may identify an input to the second portion as an input to the first portion.

Referring to FIG. 15, in an operation 1570, the processor according to an embodiment may initiate execution of the first application based on the first direction in the first screen, in response to receiving an input. For example, the processor may display at least one screen in the first screen, based on the first direction, based on initiating the execution of the first application. The at least one screen may include a plurality of contents. The user of the electronic device may control the first application based on the at least one screen.

As described above, the electronic device (e.g., the electronic device 101 of FIG. 1) and/or the processor (e.g., the processor 120 of FIG. 1) of the electronic device, in an unfolding state, may identify an angle of the first housing and the second housing based on a sensor (e.g., the sensor 160 of FIG. 1) while displaying the first screen based on the first direction, using the flexible display (e.g., the flexible display 150 of FIG. 1). The electronic device and/or the processor of the electronic device may identify that the angle is included in a specified range. Based on identifying the angle included in the specified range, the electronic device and/or the processor of the electronic device may display the second screen in the first portion of the flexible display based on the second direction associated with the first screen and different from the first direction. For example, the second screen may include at least one of a plurality of contents included in the first screen. The electronic device and/or the processor of the electronic device may receive at least one input, while displaying the second screen, using the second portion different from the first portion. The electronic device and/or the processor of the electronic device may control the second screen displayed in the first portion based on receiving the at least one input. The electronic device may provide various UIs to the user of the electronic device according to the angle.

For example, as described above, the electronic device may identify an angle of the first housing and the second housing based on a sensor. The electronic device may display a screen in a portion of the flexible display disposed in the first housing based on identifying the angle. The electronic device may map a location of an input to a different location. The electronic device may control the screen, based on the mapping, using a received input through a portion different from the portion.

As described above, according to an example embodiment, an electronic device (e.g., the electronic device 101 of FIG. 1) may comprise: a first housing (e.g., the first housing 210 of FIG. 2A), a second housing (e.g., the second housing 220 of FIG. 2A), a hinge structure including a hinge (e.g., the folding housing 265 of FIG. 2B) rotatably coupling the second housing to the first housing, a flexible display (e.g., the flexible display 150 of FIG. 1) disposed on a surface (e.g., the first surface 211 of FIG. 2A) of the first housing and a surface (e.g., the second surface 221 of FIG. 2A) of the second housing across the hinge structure, memory (e.g., the memory 130 of FIG. 1) comprising one or more storage mediums storing instructions, a sensor (e.g., the sensor 160 of FIG. 1) configured to detect an angle between the first housing and the second housing, and at least one processor, comprising processing circuitry (e.g., the processor 120 of FIG. 1), operably coupled to the flexible display, the memory, and the sensor, wherein the instructions, when executed by the at least one processor individually or collectively, may cause the electronic device to: display a first screen (e.g., the screen 340 of FIG. 3) within a first portion (e.g., the first portion 331 of FIG. 3) between the first portion and a second portion (e.g., the second portion 332 of FIG. 3) of the flexible display, based on identifying the angle included in a specified range, using the sensor; and while displaying the first screen within the first portion, display, within the second portion, a second screen (e.g., the screen 347 of FIG. 3) configured to reflect the first screen in the second portion.

For example, the instructions, when executed by the at least one processor individually or collectively, may cause the electronic device to: receive an input within the second portion, while displaying the second screen; and in response to receiving the input, execute a function based on the input, within the first screen displayed within the first portion.

For example, the instructions, when executed by the at least one processor individually or collectively, may cause the electronic device to: display a third screen (e.g., the pop-up message 1010 of FIG. 10) within the first portion, based on at least one application stored in the memory; and initiate execution of the at least one application, in response to receiving a different input from the input, within the second portion corresponding to the third screen.

For example, the specified range may include an angle causing the first screen displayed within the first portion to be reflected in the second portion.

For example, the instructions, when executed by the at least one processor individually or collectively, may cause the electronic device to: based on identifying the angle exceeding the specified range, using the sensor, display, within the first portion and the second portion, a fourth screen (e.g., the screen 343 of FIG. 3) associated with the first screen and based on a second direction (e.g., the second direction 302 of FIG. 3) different from a first direction (e.g., the first direction 301 of FIG. 3) of the first screen.

For example, the second direction may be opposite to the first direction. The instructions, when executed by the at least one processor individually or collectively, may cause the electronic device to cause the electronic device to: receive a swipe input corresponding to the first direction, within the second portion; and in response to receiving the swipe input, identify the swipe input as a swipe input corresponding to the second direction within the first screen displayed within the first portion.

For example, the fourth screen may include at least one of contents included in the first screen.

For example, the first screen may include content for controlling at least one application stored in the memory.

For example, the instructions, when executed by the at least one processor individually or collectively, may cause the electronic device to adjust brightness of the first portion to specified brightness.

For example, the instructions, when executed by the at least one processor individually or collectively, may cause the electronic device to: based on identifying the angle, using the sensor, adjust at least one of a size or a location of the first screen, within the first portion.

According to an example embodiment, an electronic device (e.g., the electronic device 101 of FIG. 1) may comprise: a first housing (e.g., the first housing 210 of FIG. 2A), a second housing (e.g., the second housing 220 of FIG. 2A), a hinge structure including a hinge (e.g., the folding housing 265 of FIG. 2B) rotatably coupling the second housing to the first housing, a flexible display (e.g., the flexible display 150 of FIG. 1) disposed on a surface (e.g., the first surface 211 of FIG. 2A) of the first housing and a surface (e.g., the second surface 221 of FIG. 2A) of the second housing across the hinge structure, memory (e.g., the memory 130 of FIG. 1) comprising one or more storage mediums storing instructions, a sensor (e.g., the sensor 160 of FIG. 1) configured to detect an angle between the first housing and the second housing, and at least one processor, comprising processing circuitry (e.g., the processor 120 of FIG. 1), operably coupled to the flexible display, the memory, and the sensor, wherein the instructions, when executed by the at least one processor individually or collectively, may cause the electronic device to: based on identifying the angle exceeding a specified angle from the sensor, display, within a first portion (e.g., the first portion 331 of FIG. 3) and a second portion (e.g., the second portion 332 of FIG. 3) different from the first portion of the flexible display, a first screen (e.g., the screen 340 of FIG. 3) based on a first direction (e.g., the first direction 301 of FIG. 3; while displaying, within the first portion and the second portion, the first screen based on the first direction, based on identifying that the angle is decreased to be equal to or less than the specified angle, using the sensor, display, within the first portion, a second screen (e.g., the screen 343 of FIG. 3) associated with the first screen and based on a second direction (e.g., the second direction 302 of FIG. 3) different from the first direction; and while displaying, within the first portion, the second screen, in response to receiving an input within the second portion, within the second screen displayed within the first portion, execute a function based on the input.

For example, the sensor may include a first sensor. The instructions, when executed by the at least one processor individually or collectively, may cause the electronic device to: deactivate a first area of a second sensor disposed in the first portion; map a second area of the second sensor disposed in the second portion to the first area, based on the angle; and identify an input corresponding to the second area as an input corresponding to the first area.

For example, the second direction may be opposite to the first direction. The instructions, when executed by the at least one processor individually or collectively, may cause the electronic device to: receive a swipe input corresponding to the first direction, within the second portion; and in response to receiving the swipe input, identify the swipe input as a swipe input corresponding to the second direction within the second screen displayed within the first portion.

For example, the instructions, when executed by the at least one processor individually or collectively, may cause the electronic device to: adjust brightness of the first portion to specified brightness; and display, within the second portion, a third screen (e.g., the screen 347 of FIG. 3) different from the second screen.

For example, the instructions, when executed by the at least one processor individually or collectively, may cause the electronic device to: in a portion of the first portion or the second portion, display the second screen, using the first sensor or a third sensor different from the first sensor and the second sensor; and display the third screen in a portion different from the portion.

For example, the second screen may include, within the first screen, at least one of contents displayed on any one of the first portion or the second portion.

For example, the instructions, when executed by the at least one processor individually or collectively, may cause the electronic device to: in a state of identifying that the angle is decreased to be equal to or less than the specified angle, display a fourth screen (e.g., the pop-up message 1010 of FIG. 10) different from the second screen within the second screen, based on at least one application stored in the memory; and in response to receiving an input different from the input, initiate execution of the at least one application, in the second portion corresponding to the fourth screen.

For example, the specified angle may be a first specified angle. The instructions, when executed by the at least one processor individually or collectively, may cause the electronic device to: in a state that the surface of the first housing and the surface of the second housing are in contact, display a fifth screen (e.g., the screen 1110 of FIG. 11) within the first portion based on identifying that the angle is increased to be equal to or greater than a second specified angle different from the first specified angle, using the sensor.

For example, the electronic device may include a display (e.g., the display 1150 of FIG. 11) different from the flexible display disposed on a surface different from at least one of the surface of the first housing or the surface of the second housing. The instructions, when executed by the at least one processor individually or collectively, may cause the electronic device to: based on at least one application stored in the memory, display a sixth screen (e.g., the screen 1210 of FIG. 12) including information requesting to adjust the first housing and the second housing to be equal to or less than the specified angle on the different display.

For example, the instructions, when executed by the at least one processor individually or collectively, may cause the electronic device to, within the second screen, include content (e.g., the navigation bar 901 of FIG. 9) for controlling at least one application stored in the memory.

According to an example embodiment, an electronic device (e.g., the electronic device 101 of FIG. 1) may comprise: a first housing (e.g., the first housing 210 of FIG. 2A), a second housing (e.g., the second housing 220 of FIG. 2A), a hinge structure including a hinge (e.g., the folding housing 265 of FIG. 2B) rotatably coupling the second housing to the first housing, a flexible display (e.g., the flexible display 150 of FIG. 1) disposed on a surface (e.g., the first surface 211 of FIG. 2A) of the first housing and a surface (e.g., the second surface 221 of FIG. 2A) of the second housing across the hinge structure, memory (e.g., the memory 130 of FIG. 1) comprising one or more storage mediums storing instructions, a sensor (e.g., the sensor 160 of FIG. 1) configured to detect an angle between the first housing and the second housing, and at least one processor, comprising processing circuitry (e.g., the processor 120 of FIG. 1), operably coupled to the flexible display, the memory, and the sensor, wherein the instructions, when executed by the at least one processor individually or collectively, may cause the electronic device to: identify, from the sensor, the angle exceeding a specified angle; based on identifying the angle, display a first screen (e.g., the screen 343 of FIG. 3) within a first portion (e.g., the first portion 331 of FIG. 3) of the flexible display based on a first direction (e.g., the second direction 302 of FIG. 3), using a first application among a plurality of applications stored in the memory; while displaying the first screen in the first portion, display a second screen (e.g., the screen 347 of FIG. 3) different from the first screen within a second portion (e.g., the second portion 332 of FIG. 3) different from the first portion; while displaying the second screen, receive at least one input within the second portion; and, in response to receiving the input, initiate execution of the first application, within the first screen based on the first direction.

For example, the sensor may include a first sensor. The instructions, when executed by the at least one processor individually or collectively, may cause the electronic device to: deactivate a first area of a second sensor disposed in the first portion; map an input for a second area different from the first area disposed in the second portion as an input for the first area, based on the angle; and identify an input for the second area as an input for the first area, based on the mapping.

For example, the instructions, when executed by the at least one processor individually or collectively, may cause the electronic device to: receive a swipe input corresponding to a second direction (e.g., the second direction 302 of FIG. 3), opposite to the first direction, within the second portion; and in response to receiving the swipe input, identify the swipe input as a swipe input corresponding to the first direction within the first screen displayed within the first portion.

For example, the instructions, when executed by the at least one processor individually or collectively, may cause the electronic device to adjust brightness of the first portion to specified brightness.

For example, the instructions, when executed by the at least one processor individually or collectively, may cause the electronic device to, based on identifying the angle, using the sensor, adjust at least one of a size or location of the first screen, within the first portion.

For example, the instructions, when executed by the at least one processor individually or collectively, may cause the electronic device to: identify whether to display the first screen on any one of the first portion or the second portion using a third sensor (e.g., the acceleration sensor 162 of FIG. 1; display the first screen in the identified portion based on the identification; and while displaying the first screen, display the second screen in a portion different from the identified portion.

For example, the first screen may include content (e.g., the navigation bar 901 of FIG. 9) for controlling at least one application stored in the memory.

For example, the specified angle may be a first specified angle. The instructions, when executed by the at least one processor individually or collectively, may cause the electronic device to control the electronic device to: based on a second application different from the first application, display a fourth screen (e.g., the video 806 of FIG. 8) within the first portion based on the first direction; and based on identifying the angle exceeding a second specified angle using the sensor, display a fifth screen associated with the fourth screen and based on a second direction different from the first direction, within the first portion and the second portion.

For example, the instructions, when executed by the at least one processor individually or collectively, may cause the electronic device to, based on a third application, within the first portion, display information requesting to maintain within the first specified angle and the second specified angle range.

For example, content included in the fifth screen may include a video (e.g., the video 801 of FIG. 8) and information (e.g., the screen 802 of FIG. 8) different from the video. The instructions, when executed by the at least one processor individually or collectively, may cause the electronic device to, based on the second application, play the video within the first portion, and while displaying the information in the second portion, using the sensor, display the fourth screen including the video in the first portion, based on identifying the angle less than the second specified angle.

According to an example embodiment, a method of operating an electronic device (e.g., the electronic device 101 of FIG. 1) may comprise: based on identifying an angle exceeding a specified angle from a sensor (e.g., the sensor 160 of FIG. 1), displaying, within a first portion (e.g., the first portion 331 of FIG. 3) and a second portion (e.g., the second portion 332 of FIG. 3) different from the first portion of a flexible display (e.g., the flexible display 150 of FIG. 1), a first screen (e.g., the screen 340 of FIG. 3) based on a first direction (e.g., the first direction 301 of FIG. 3; while displaying, within the first portion and the second portion, the first screen based on the first direction, based on identifying that the angle is decreased to be equal to or less than the specified angle, using the sensor, displaying, within the first portion, a second screen (e.g., the screen 343 of FIG. 3) associated with the first screen and based on a second direction (e.g., the second direction 302 of FIG. 3) different from the first direction; and while displaying, within the first portion, the second screen, in response to receiving an input within the second portion, within the second screen displayed within the first portion, executing a function based on the input.

For example, the sensor may include a first sensor. The method of operating the electronic device may comprise: deactivating a first area of a second sensor disposed in the first portion; mapping a second area of the second sensor disposed in the second portion to the first area, based on the angle; and identifying an input corresponding to the second area as an input corresponding to the first area.

For example, the second direction may be opposite to the first direction. The method of operating the electronic device may comprise: receiving a swipe input corresponding to the first direction, within the second portion; and in response to receiving the swipe input, identifying the swipe input as a swipe input corresponding to the second direction within the second screen displayed within the first portion.

For example, the second screen may include, within the first screen, at least one of contents displayed on any one of the first portion or the second portion.

For example, the method of operating the electronic device may comprise: adjusting brightness of the first portion to specified brightness; and displaying, within the second portion, a third screen (e.g., the screen 347 of FIG. 3) different from the second screen.

According to an example embodiment, a method of operating an electronic device (e.g., the electronic device 101 of FIG. 1) may comprise: in a state that a surface (e.g., the first surface 211 of FIG. 2A) of a first housing (e.g., the first housing 210 of FIG. 2A) and a surface (e.g., the second surface 221 of FIG. 2A) of a second housing (e.g., the second housing 220 of FIG. 2A) are in contact, identifying, an angle exceeding a specified angle from a sensor (e.g., the sensor 160 of FIG. 1; based on identifying the angle, displaying, a first screen (e.g., the screen 343 of FIG. 3) within a first portion (e.g., the first portion 331 of FIG. 3) of a flexible display (e.g., the flexible display 150 of FIG. 1) based on a first direction (e.g., the first direction 301 of FIG. 3), using a first application among a plurality of applications stored in memory (e.g., the memory 130 of FIG. 1; while displaying the first screen in the first portion, displaying, a second screen (e.g., the screen 347 of FIG. 3) different from the first screen within a second portion (e.g., the second portion 332 of FIG. 3) different from the first portion, and while displaying the second screen, receiving at least one input within the second portion; and in response to receiving the input, initiating execution of the first application.

For example, the sensor may include a first sensor. The method of operating the electronic device may comprise: deactivating a first area of a second sensor disposed in the first portion; mapping an input for a second area different from the first area disposed in the second portion as an input for the first area, based on the angle; and identifying an input for the second area as an input for the first area, based on the mapping.

For example, the method of operating the electronic device may comprise, based on identifying the angle, using the sensor, adjusting at least one of a size or location of the first screen, within the first portion.

For example, the specified angle may be a first specified angle. The method of operating the electronic device may comprise: based on a second application different from the first application, displaying a fourth screen (e.g., the video 806 of FIG. 8) within the first portion based on the first direction; and based on identifying the angle exceeding a second specified angle using the sensor, displaying a fifth screen associated with the fourth screen and based on a second direction different from the first direction, within the first portion and the second portion.

For example, the method of operating the electronic device may comprise, based on a third application, within the first portion, displaying information requesting to maintain within the first specified angle and the second specified angle range.

For example, the electronic device may identify an angle of the first housing and the second housing based on a sensor. The electronic device may display a screen in a portion of the flexible display disposed in the first housing based on identifying the angle. The electronic device may map a location of an input to a different location. The electronic device may control the screen, based on the mapping, using a received input through a portion different from the portion.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a first housing,
   a second housing,
   a hinge structure including a hinge rotatably coupling the second housing to the first housing,
   a flexible display disposed at the first housing and the second housing,
   memory comprising one or more storage mediums storing instructions,
   a sensor configured to detect an angle between the first housing and the second housing, and
   at least one processor, comprising processing circuitry, operably coupled to the flexible display, the memory, and the sensor,
   wherein the instructions, when executed by the at least one processor individually or collectively, cause the electronic device to:
   display a first screen within a first portion between the first portion and a second portion of the flexible display, based on identifying the angle included in a specified range, using the sensor, and
   while displaying the first screen within the first portion, display, within the second portion, a second screen for reflecting the first screen in the second portion.

2. The electronic device of claim 1,
   wherein the instructions, when executed by the at least one processor individually or collectively, cause the electronic device to:
   receive an input within the second portion, while displaying the second screen, and
   in response to receiving the input, execute a function based on the input, within the first screen displayed within the first portion.

3. The electronic device of claim 2,
   wherein the instructions, when executed by the at least one processor individually or collectively, cause the electronic device to:
   display a third screen within the first portion, based on at least one application stored in the memory, and
   initiate execution of the at least one application, in response to receiving a different input from the input, within the second portion corresponding to the third screen.

4. The electronic device of claim 1,
wherein the specified range includes an angle causing the first screen displayed within the first portion to be reflected in the second portion.

5. The electronic device of claim 1,
wherein the instructions, when executed by the at least one processor individually or collectively, cause the electronic device to:
based on identifying the angle exceeding the specified range, using the sensor, display, within the first portion and the second portion, a fourth screen associated with the first screen and based on a second direction different from a first direction of the first screen.

6. The electronic device of claim 5,
wherein the second direction is opposite to the first direction, and
wherein the instructions, when executed by the at least one processor individually or collectively, cause the electronic device to:
receive a swipe input corresponding to the first direction, within the second portion, and
in response to receiving the swipe input, identify the swipe input as a swipe input corresponding to the second direction within the first screen displayed within the first portion.

7. The electronic device of claim 5,
wherein the fourth screen includes at least one of contents included in the first screen.

8. The electronic device of claim 1,
wherein the first screen includes content for controlling at least one application stored in the memory.

9. The electronic device of claim 1,
wherein the instructions, when executed by the at least one processor individually or collectively, cause the electronic device to:
adjust brightness of the first portion to specified brightness.

10. The electronic device of claim 1,
wherein the instructions, when executed by the at least one processor individually or collectively, cause the electronic device to:
based on identifying the angle, using the sensor, adjust at least one of a size or a location of the first screen, within the first portion.

11. A method of operating an electronic device comprising
based on identifying an angle exceeding a specified angle from a sensor, displaying, within a first portion and a second portion different from the first portion of a flexible display, a first screen based on a first direction,
while displaying, within the first portion and the second portion, the first screen based on the first direction, based on identifying that the angle is decreased to be equal to or less than the specified angle, using the sensor, displaying, within the first portion, a second screen associated with the first screen and based on a second direction different from the first direction, and
while displaying, within the first portion, the second screen, in response to receiving an input within the second portion, within the second screen displayed within the first portion, executing a function based on the input.

12. The method of claim 11,
wherein the sensor includes a first sensor, and
wherein the method comprises:
deactivating a first area of a second sensor disposed on the first portion,
mapping a second area of the second sensor disposed on the second portion to the first area, based on the angle, and
identifying an input corresponding to the second area as an input corresponding to the first area.

13. The method of claim 12,
wherein the second direction is opposite to the first direction,
wherein the method comprises:
receiving a swipe input corresponding to the first direction, within the second portion, and
in response to receiving the swipe input, identifying the swipe input as a swipe input corresponding to the second direction within the second screen displayed within the first portion.

14. The method of claim 12, comprising:
adjusting brightness of the first portion to specified brightness, and
displaying, within the second portion, a third screen different from the second screen.

15. The method of claim 11,
wherein the second screen includes at least one of contents within the first screen displayed on any one of the first portion or the second portion.

16. A method of operating an electronic device comprising
in a state that a surface of a first housing and a surface of a second housing are in contact, identifying, an angle exceeding a specified angle from a sensor,
based on identifying the angle, displaying, a first screen within a first portion of a flexible display based on a first direction, using a first application among a plurality of applications stored in memory,
while displaying the first screen in the first portion, displaying, a second screen different from the first screen within a second portion different from the first portion, and while displaying the second screen, receiving at least one input within the second portion,
in response to receiving the input, initiating execution of the first application.

17. The method of claim 16,
wherein the sensor includes a first sensor, and
wherein the method comprises:
deactivating a first area of a second sensor disposed in the first portion,
mapping an input for a second area different from the first area disposed in the second portion as an input for the first area, based on the angle, and
identifying an input for the second area as an input for the first area, based on the mapping.

18. The method of claim 16, comprising:
based on identifying the angle, using the sensor, adjusting at least one of a size or location of the first screen, within the first portion.

19. The method of claim 16,
wherein the specified angle is a first specified angle, and
wherein the method comprises:
based on a second application different from the first application, displaying a fourth screen within the first portion based on the first direction, and
based on identifying the angle exceeding a second specified angle using the sensor, displaying a fifth screen associated with the fourth screen and based on a second direction different from the first direction, within the first portion and the second portion.

20. The method of claim 19, comprising:
based on a third application, within the first portion, displaying information requesting to maintain within the first specified angle and the second specified angle.

* * * * *